US008342938B2

(12) United States Patent
Paulsen et al.

(10) Patent No.: US 8,342,938 B2
(45) Date of Patent: Jan. 1, 2013

(54) GAMING MACHINE REEL HAVING A ROTATABLE DYNAMIC DISPLAY

(75) Inventors: Craig A. Paulsen, Reno, NV (US); Chauncey W. Griswold, Reno, NV (US); Joseph R. Hedrick, Reno, NV (US); Richard L. Wilder, Sparks, NV (US); Harold E. Mattice, Gardnerville, NV (US)

(73) Assignee: IGT, Reno, NV (US)

( * ) Notice: Subject to any disclaimer, the term of this patent is extended or adjusted under 35 U.S.C. 154(b) by 986 days.

(21) Appl. No.: 12/247,844

(22) Filed: Oct. 8, 2008

(65) Prior Publication Data

US 2009/0104969 A1 Apr. 23, 2009

Related U.S. Application Data

(63) Continuation-in-part of application No. 09/964,962, filed on Sep. 27, 2001, now Pat. No. 8,002,624.

(51) Int. Cl.
*A63F 9/24* (2006.01)
*A63F 13/00* (2006.01)
*G06F 17/00* (2006.01)
*G06F 19/00* (2011.01)

(52) U.S. Cl. .............................. 463/20; 463/16; 313/511

(58) Field of Classification Search ........................ None
See application file for complete search history.

(56) References Cited

U.S. PATENT DOCUMENTS 1,488,889 A 4/1924 Lollis
3,864,024 A 2/1975 Olson
4,127,849 A 11/1978 Okor
4,448,419 A 5/1984 Telnaes
4,614,342 A 9/1986 Takashima
4,711,452 A 12/1987 Dickinson et al.
4,712,799 A * 12/1987 Fraley .............................. 463/20
4,838,552 A 6/1989 Hagiwara
4,856,787 A 8/1989 Itkis
4,932,147 A 6/1990 David (Continued)

FOREIGN PATENT DOCUMENTS

EP 0 134 979 3/1985

(Continued)

OTHER PUBLICATIONS

"The Tube," Businessweek Online: http://www.businessweek.com:/2000/00_10/design3.htm?scriptFramed, pp. 1-2, dated Mar. 6, 2001, printed Dec. 20, 2001.

(Continued)

*Primary Examiner* — Paul A D'Agostino
(74) *Attorney, Agent, or Firm* — Weaver, Austin, Villeneuve & Sampson, LLP

(57) ABSTRACT

A gaming machine reel having a motor capable of rotating the reel operatively coupled to a controller to control a reel rotation speed, a support mechanism coupled to the motor having an outer circumferential region, a rotatable display mounted on the outer circumferential region operable to rotate about an axis of the reel. The rotatable display may be used to display game play indicia utilized in a wager-based game of chance. A game controller coupled to the rotatable display may be configured to determine a portion of the rotatable display that is visible through a viewing window on the gaming machine at a particular, determine pixel locations associated with the visible portions and map visual content to the visible portions as a function of time while the rotatable display is rotating.

19 Claims, 13 Drawing Sheets

U.S. PATENT DOCUMENTS

| | | | |
|---|---|---|---|
| 5,026,152 | A | 6/1991 | Sharkey |
| 5,135,224 | A | 8/1992 | Yamamoto et al. |
| 5,162,696 | A * | 11/1992 | Goodrich ........ 313/511 |
| 5,239,227 | A | 8/1993 | Kikinis |
| 5,342,047 | A | 8/1994 | Heidel et al. |
| 5,413,357 | A | 5/1995 | Schulze et al. |
| 5,524,888 | A | 6/1996 | Heidel |
| 5,580,055 | A | 12/1996 | Hagiwara |
| 5,634,080 | A | 5/1997 | Kikinis et al. |
| 5,680,160 | A | 10/1997 | LaPointe |
| 5,688,551 | A | 11/1997 | Littman et al. |
| 5,752,881 | A * | 5/1998 | Inoue ........ 463/20 |
| 5,770,533 | A | 6/1998 | Franchi |
| 5,770,914 | A * | 6/1998 | Pease et al. ........ 310/339 |
| 5,788,573 | A | 8/1998 | Baerlocher et al. |
| 5,803,453 | A | 9/1998 | Stephan et al. |
| 5,807,172 | A | 9/1998 | Piechowiak |
| 5,816,918 | A | 10/1998 | Kelly et al. |
| 5,839,957 | A | 11/1998 | Schneider et al. |
| 5,839,960 | A | 11/1998 | Parra et al. |
| 5,911,419 | A | 6/1999 | Delaney et al. |
| 5,924,926 | A | 7/1999 | Brown |
| 5,929,474 | A | 7/1999 | Huang et al. |
| 5,934,672 | A * | 8/1999 | Sines et al. ........ 273/143 R |
| 5,947,820 | A | 9/1999 | Morro et al. |
| 5,951,397 | A | 9/1999 | Dickinson |
| 5,965,907 | A | 10/1999 | Huang et al. |
| 5,971,271 | A | 10/1999 | Wynn et al. |
| 5,977,704 | A | 11/1999 | Shi et al. |
| 6,002,206 | A | 12/1999 | Harrison et al. |
| 6,008,784 | A | 12/1999 | Acres et al. |
| 6,016,176 | A | 1/2000 | Kim et al. |
| 6,027,115 | A * | 2/2000 | Griswold et al. ........ 273/143 R |
| 6,033,307 | A | 3/2000 | Vancura |
| 6,068,552 | A | 5/2000 | Walker et al. |
| 6,075,316 | A | 6/2000 | Shi et al. |
| 6,082,887 | A | 7/2000 | Feuer et al. |
| 6,086,066 | A * | 7/2000 | Takeuchi et al. ........ 273/143 R |
| 6,135,884 | A | 10/2000 | Hedrick et al. |
| 6,155,925 | A | 12/2000 | Giobbi et al. |
| 6,162,121 | A | 12/2000 | Morro et al. |
| 6,166,496 | A | 12/2000 | Lys et al. |
| 6,205,690 | B1 | 3/2001 | Heropoulos et al. |
| 6,229,505 | B1 | 5/2001 | Fujii |
| 6,251,014 | B1 | 6/2001 | Stockdale et al. |
| 6,254,481 | B1 | 7/2001 | Jaffe et al. |
| 6,264,561 | B1 | 7/2001 | Saffari et al. |
| 6,287,202 | B1 | 9/2001 | Pascal et al. |
| 6,315,666 | B1 | 11/2001 | Mastera et al. |
| 6,366,016 | B1 | 4/2002 | Sakaguchi et al. |
| 6,368,216 | B1 | 4/2002 | Hedrick et al. |
| 6,406,371 | B1 | 6/2002 | Baba et al. |
| 6,454,649 | B1 | 9/2002 | Mattice et al. |
| 6,464,581 | B1 | 10/2002 | Yoseloff et al. |
| 6,485,884 | B2 | 11/2002 | Wolk et al. |
| 6,502,758 | B2 | 1/2003 | Cottrell |
| 6,503,147 | B1 | 1/2003 | Stockdale et al. |
| 6,517,433 | B2 | 2/2003 | Loose et al. |
| 6,523,824 | B1 * | 2/2003 | Colapinto et al. ........ 273/143 R |
| 6,530,165 | B2 | 3/2003 | Griesemer et al. |
| 6,609,968 | B1 | 8/2003 | Okada et al. |
| 6,638,165 | B2 | 10/2003 | Uchiyama et al. |
| 6,659,866 | B2 | 12/2003 | Frost et al. |
| 6,722,987 | B2 | 4/2004 | Orr et al. |
| 6,743,094 | B2 | 6/2004 | Johnson |
| 6,743,102 | B1 | 6/2004 | Fiechter et al. |
| 6,773,345 | B2 | 8/2004 | Walker et al. |
| 6,786,818 | B1 * | 9/2004 | Rothschild et al. ........ 463/20 |
| 6,798,148 | B2 | 9/2004 | Inukai |
| 6,817,946 | B2 | 11/2004 | Motegi et al. |
| 6,893,345 | B2 | 5/2005 | Motegi et al. |
| 6,908,387 | B2 | 6/2005 | Hedrick et al. |
| 6,911,781 | B2 | 6/2005 | Yamazaki et al. |
| 6,923,720 | B2 | 8/2005 | Loose |
| 6,939,226 | B1 | 9/2005 | Joshi |
| 7,008,324 | B1 | 3/2006 | Johnson et al. |
| 7,048,629 | B2 | 5/2006 | Sines et al. |
| 7,053,890 | B2 | 5/2006 | Inukai |
| 7,121,945 | B2 | 10/2006 | Suganuma et al. |
| 7,169,048 | B2 | 1/2007 | Nozaki et al. |
| 7,204,753 | B2 | 4/2007 | Ozaki et al. |
| 7,335,101 | B1 | 2/2008 | Luciano, Jr. |
| 7,344,442 | B2 * | 3/2008 | Inoue ........ 463/20 |
| 7,542,198 | B2 | 6/2009 | Kothari |
| 7,682,249 | B2 | 3/2010 | Winans et al. |
| 7,811,170 | B2 | 10/2010 | Winans et al. |
| 7,887,408 | B2 * | 2/2011 | Walker et al. ........ 463/20 |
| 8,002,624 | B2 | 8/2011 | Paulsen et al. |
| 8,016,670 | B2 | 9/2011 | Lemay et al. |
| 8,092,305 | B2 * | 1/2012 | Seelig et al. ........ 463/31 |
| 8,096,878 | B2 * | 1/2012 | Durham et al. ........ 463/31 |
| 8,137,176 | B2 * | 3/2012 | Bernard et al. ........ 463/16 |
| 2002/0012898 | A1 | 1/2002 | Shechter et al. |
| 2002/0082083 | A1 | 6/2002 | Ito et al. |
| 2002/0142846 | A1 | 10/2002 | Paulsen |
| 2002/0173354 | A1 | 11/2002 | Winans et al. |
| 2002/0175466 | A1 * | 11/2002 | Loose et al. ........ 273/143 R |
| 2002/0187831 | A1 | 12/2002 | Arikawa et al. |
| 2003/0032479 | A1 | 2/2003 | LeMay et al. |
| 2003/0045343 | A1 | 3/2003 | Luccesi et al. |
| 2003/0060269 | A1 * | 3/2003 | Paulsen et al. ........ 463/20 |
| 2003/0064784 | A1 | 4/2003 | Wells et al. |
| 2003/0195045 | A1 | 10/2003 | Kaminkow et al. |
| 2003/0220134 | A1 * | 11/2003 | Walker et al. ........ 463/20 |
| 2003/0220139 | A1 | 11/2003 | Peterson |
| 2003/0232651 | A1 | 12/2003 | Huard et al. |
| 2004/0082385 | A1 | 4/2004 | Silva et al. |
| 2004/0102245 | A1 * | 5/2004 | Escalera et al. ........ 463/32 |
| 2004/0142745 | A1 | 7/2004 | Hosaka |
| 2004/0166940 | A1 | 8/2004 | Rothschild |
| 2004/0219978 | A1 | 11/2004 | Teramoto et al. |
| 2004/0266518 | A1 * | 12/2004 | Gauselmann ........ 463/20 |
| 2005/0054423 | A1 * | 3/2005 | Wadleigh ........ 463/20 |
| 2005/0054440 | A1 | 3/2005 | Anderson et al. |
| 2005/0101387 | A1 | 5/2005 | Wolf |
| 2005/0153776 | A1 | 7/2005 | LeMay et al. |
| 2005/0170736 | A1 * | 8/2005 | Cok ........ 445/24 |
| 2005/0170890 | A1 | 8/2005 | Rowe et al. |
| 2005/0272505 | A1 | 12/2005 | Okamura |
| 2006/0014580 | A1 | 1/2006 | Hawthorn |
| 2006/0100013 | A1 | 5/2006 | Enzminger |
| 2006/0100019 | A1 | 5/2006 | Hornik |
| 2006/0128467 | A1 * | 6/2006 | Thomas ........ 463/31 |
| 2006/0281529 | A1 * | 12/2006 | Seelig et al. ........ 463/20 |
| 2007/0004510 | A1 | 1/2007 | Underdahl et al. |
| 2007/0052660 | A1 | 3/2007 | Montbach et al. |
| 2007/0054730 | A1 | 3/2007 | Mattice et al. |
| 2007/0093290 | A1 | 4/2007 | Winans et al. |
| 2007/0283265 | A1 | 12/2007 | Portano |
| 2007/0293299 | A1 | 12/2007 | Aida |
| 2008/0020827 | A1 | 1/2008 | Underdahl et al. |
| 2008/0096624 | A1 | 4/2008 | Rydberg |
| 2008/0200233 | A1 | 8/2008 | Aida |
| 2008/0214277 | A1 * | 9/2008 | Kishi ........ 463/20 |

FOREIGN PATENT DOCUMENTS

| | | |
|---|---|---|
| EP | 0 246 021 | 11/1987 |
| EP | 0 288 152 | 10/1988 |
| EP | 0 896 308 | 2/1999 |
| EP | 1 082 980 | 3/2001 |
| EP | 1 291 829 | 3/2003 |
| EP | 1 422 673 | 5/2004 |
| EP | 1 550 987 | 7/2005 |
| GB | 2 092 795 | 8/1982 |
| GB | 2 116 345 | 9/1983 |
| GB | 2 253 299 | 9/1992 |
| GB | 2 447 481 | 9/2008 |
| JP | 2002-360908 | 12/2002 |
| JP | 2004-081826 | 3/2004 |
| JP | 2004-089689 | 3/2004 |
| WO | WO 98/03962 | 1/1998 |
| WO | WO 98/50804 | 11/1998 |
| WO | WO 00/55879 | 9/2000 |
| WO | WO 00/60669 | 10/2000 |
| WO | WO 02/17613 | 2/2002 |
| WO | WO 02/091319 | 11/2002 |
| WO | WO 2005/071628 | 8/2005 |

| | | |
|---|---|---|
| WO | WO 2005/114600 | 12/2005 |
| WO | WO 2008/030781 | 3/2008 |
| WO | WO 2008/057929 | 5/2008 |
| WO | WO 2010/042328 | 4/2010 |

OTHER PUBLICATIONS

Lieberman, David, "Push is on to Replace Glass with Plastic in LCDs," EETimes.com: http://www.etimes.com/story/OEG19990615S0031, pp. 1-4, dated Jun. 15, 1998, printed Sep. 6, 2000.
"Foled Flexible Organic Light Emitting Device," Universal Display Corporation Online: http://www.universaldisplay.com/foled.php, pp. 1-2, printed Apr. 26, 2001.
AV Video: Announce World's First Video-Capable Flexible Plastic LCD Display: Jun. 2001, http://www.avvideo.com/2001/06_jun/news/plastic_video.htm.
U.S. Office Action dated Aug. 8, 2008 from corresponding U.S. Appl. No. 09/964,962.
US Office Action dated Jul. 12, 2007 issued in U.S. Appl. No. 10/756,225.
US Final Office Action dated Jan. 8, 2008 issued in U.S. Appl. No. 10/756,225.
US Office Action dated Jun. 26, 2008 issued in U.S. Appl. No. 10/756,225.
US Final Office Action dated Feb. 2, 2009 issued in U.S. Appl. No. 10/756,225.
US Advisory Action dated Apr. 21, 2009 issued in U.S. Appl. No. 10/756,225.
US Office Action dated Jul. 7, 2009 issued in U.S. Appl. No. 10/756,225.
US Office Action dated Apr. 28, 2011 issued in U.S. Appl. No. 10/756,225.
US Notice of Allowance dated Jun. 24, 2011 issued in U.S. Appl. No. 10/756,225.
US Notice of Allowance dated Jul. 7, 2009 issued in U.S. Appl. No. 10/756,225.
US Office Action dated Jun. 25, 2010 issued in U.S. Appl. No. 11/592,614.
US Office Action Final dated Nov. 1, 2010 issued in U.S. Appl. No. 11/592,614.
US Office Action dated Jun. 23, 2009 issued in U.S. Appl. No. 11/517,861.
US Final Office Action dated Mar. 15, 2010 issued in U.S. Appl. No. 11/517,861.
US Office Action dated Jul. 28, 2011 issued in U.S. Appl. No. 11/517,861.
US Final Office Action dated Nov. 2, 2011 issued in U.S. Appl. No. 11/517,861.
US Office Action dated Jun. 25, 2009 issued in U.S. Appl. No. 11/880,937.
US Office Action Final dated Jan. 21, 2010 issued in U.S. Appl. No. 11/880,937.
US Office Action dated Mar. 30, 1999 issued in U.S. Appl. No. 09/047,889.
US Notice of Allowance dated Sep. 22, 1999 issued in U.S. Appl. No. 09/047,889.
US Office Action dated Mar. 24, 2003 issued in U.S. Appl. No. 09/964,962.
US Office Action dated Oct. 7, 2003 issued in U.S. Appl. No. 09/964,962.
US Final Office Action dated Apr. 26, 2004 issued in U.S. Appl. No. 09/964,962.
US Office Action dated May 2, 2006 issued in U.S. Appl. No. 09/964,962.
US Office Action (Interview Summary) dated Jul. 10, 2006 issued in U.S. Appl. No. 09/964,962.
US Final Office Action dated Dec. 7, 2006 issued in U.S. Appl. No. 09/964,962.
US Office Action dated Sep. 20, 2007 issued in U.S. Appl. No. 09/964,962.
US Final Office Action dated Apr. 21, 2009 issued in U.S. Appl. No. 09/964,962.
US Office Action dated Jul. 6, 2009 issued in U.S. Appl. No. 09/964,962.
US Office Action Final dated Mar. 16, 2010 issued in U.S. Appl. No. 09/964,962.
US Office Action Final dated Aug. 16, 2010 issued in U.S. Appl. No. 09/964,962.
US Office Action dated Dec. 21, 2010 issued in U.S. Appl. No. 09/964,962.
US Notice of Allowance dated Apr. 1, 2011 issued in U.S. Appl. No. 09/964,962.
US Office Action dated Oct. 5, 2005 issued in U.S. Appl. No. 10/139,801.
US Office Action Final dated Mar. 16, 2006 issued in U.S. Appl. No. 10/139,801.
US Office Action dated Jul. 6, 2006 issued in U.S. Appl. No. 10/139,801.
US Office Action Final dated Jan. 5, 2007 issued in U.S. Appl. No. 10/139,801.
US Advisory Action dated Apr. 4, 2007 issued in U.S. Appl. No. 10/139,801.
US Office Action dated Jun. 4, 2007 issued in U.S. Appl. No. 10/139,801.
US Office Action Final dated Feb. 21, 2008 issued in U.S. Appl. No. 10/139,801.
US Office Action dated Aug. 20, 2008 issued in U.S. Appl. No. 10/139,801.
US Office Action dated Jan. 30, 2009 issued in U.S. Appl. No. 10/139,801.
US Notice of Allowance dated Sep. 14, 2009 issued in U.S. Appl. No. 10/139,801.
US Notice of Allowance dated Dec. 2, 2009 issued in U.S. Appl. No. 10/139,801.
US Office Action dated Oct. 31, 2008 issued in U.S. Appl. No. 11/546,659.
US Office Action dated May 12, 2009 issued in U.S. Appl. No. 11/546,659.
US Notice of Allowance dated Apr. 20, 2010 issued in U.S. Appl. No. 11/546,659.
US Notice of Allowance dated Aug. 26, 2010 issued in U.S. Appl. No. 11/546,659.
PCT International Search Report dated Jun. 6, 2005 issued in PCT/US2005/000387.
PCT Written Opinion dated Jun. 6, 2005 issued in PCT/US2005/000387.
PCT International Preliminary Report on Patentability and Written Opinion dated Jul. 17, 2006 issued in PCT/US2005/000387.
AU Examiner's First Report dated Nov. 13, 2009 issued in 2005207295.
AU Notice of Acceptance dated Aug. 25, 2010 issued in 2005207295.
Canadian Office Action dated Apr. 12, 2011 issued in CA 2,552,400.
Canadian Second Office Action dated Mar. 28, 2012 issued in CA 2,552,400.
Chinese First Office Action dated Nov. 28, 2008 issued in 200580002282.8.
Chinese Second Office Action dated Mar. 1, 2010 issued in 200580002282.8.
Chinese Third Office Action dated Feb. 16, 2011 issued in 200580002282.8.
Chinese Fourth Office Action dated Sep. 15, 2011 issued in 200580002282.8.
Chinese Fifth Office Action dated Dec. 23, 2011 issued in 200580002282.8.
European Office Action dated Apr. 24, 2009 issued in 05 705 161.7-1238.
Mexican Office Action dated May 12, 2009 issued in 06/07949.
Russian Office Action dated Dec.15, 2006 issued in 2006124191/09.
Russian Office Action dated Dec. 8, 2008 issued in 2006124191/09.
PCT International Search Report dated Apr. 16, 2008 issued in PCT/US2007/083315.
PCT International Preliminary Report on Patentability and Written Opinion dated Mar. 10, 2009 issued in PCT/US2007/083315.
AU Examiner's first report dated Aug. 5, 2011 issued in AU 2007317424.

AU Examiner's Report No. 2 dated Dec. 20, 2011 issued in AU 2007317424.
European Examination Report dated Oct. 30, 2009 issued in 07 863 774.1-2221.
European Examination Report dated Jun. 4, 2010 issued in 07 863 774.1-2221.
European Communication Report dated Feb. 3, 2011 issued in 07 863 774.1-2221.
PCT International Search Report dated Apr. 9, 2008 issued in PCT/US2007/077453.
PCT International Preliminary Report on Patentability and Written Opinion dated Mar. 10, 2009 issued in PCT/US2007/077453.
PCT International Search Report and Written Opinion dated Jan. 21, 2010 issued in PCT/US2009/058261.
PCT International Preliminary Report on Patentability and Written Opinion dated Apr. 21, 2011 issued in PCT/US2009/058261.
PCT International Search Report dated Aug. 14, 2003 issued in PCT/US02/13863.
PCT Written Opinion dated Sep. 24, 2003 issued in PCT/US02/13863.
PCT International Preliminary Examination Report dated Nov. 24, 2003 issued in PCT/US02/13863.
Patent Abstracts of Japan vol. 2000, No. 09, Oct. 13, 2000 & JP 2000172444 A (Semiconductor Energy Lab Co Ltd), Jun. 23, 2000 abstract.
Patent Abstracts of Japan vol. 2000, No. 20, Jul. 10, 2001 & JP 2001 076886 A (Futaba Corp), Mar. 23, 2001 (2001/3/23) abstract.
Australian Examiner's First Report dated Feb. 16, 2007 issued in AU 2002256429.
Australian Examiner's First Report dated Jan. 15, 2009 issued in AU 2007216701.
EP Examination Report dated Dec. 9, 2005 issued in EP 02 725 894.6-2218.
EP Examination Report dated Jan. 12, 2007 issued in EP 02 725 894.6-2218.
EP Examiner's Report dated Jul. 20, 2009 issued in EP 02 725 894.6-2218.
Del Conte, Natali T. (Aug. 29, 2006) "Philips Demos Digital Game Board"[online] [retrieval date unknown] Retrieved from: http://www.pcmag.com/article2/0,1895,2009874,00.asp, 2 pages.
Display of "High Rollers Triple Diamond" Gaming Machine at a casino in Nevada in about 1995 (photograph of similar machine) 2 pages.
"First Generation Electronic Paper Display From Philips, Sony and E Ink to be Used in New Electronic Reading Device", (Mar. 24, 2004) [online] [retrieved on Sep. 8, 2005] Retrieved from: URL:http://www.eink.com/news/releases/pr70.html, 2 pages, XP002344236.
IBM, *Organic Light Emitting Diodes Project*, downloaded from Internet Apr. 16, 2002, http://www.almaden.ibm.com/st/projects/oleds/ 4 pages.
Kavoossi B, (Dec. 12, 2001) "Printed Micro Systems on Paper", [online] [retrieved on Sep. 9, 2005] Retrieved from: URL:http://www.tekes.fi/julkaisut/Active_imaging.pdf, pp. 1-106, XP-002344235.
Kodak, *What It Is* downloaded from Internet Apr. 25, 2002, http://www.kodak.corn/US/en/corp/display/overview.jhtml 9 pages.
Planar Operations Manual (prior to Jan. 1997) "Electroluminescent Display" Planar America, Inc., 1400 NW Campton Drive, Beaverton, Oregon 97006, 3 pages.
Rolltronics, By Dr. James Sheats, *Introduction to Organic Light-Emitting Diodes(OLEDs)*, downloaded from Internet Apr. 16, 2002, http://www.rolltronics.com/introoled.htp 9 pages.
Schröder, Tim (Feb. 28, 2005) "Microelectronics Display Panels with Electronic Ink", Fraunhofer Magazin, Fraunhofer Gesellschaft, Muenchen, DE, 2:38-39, XP-002344237 pp. 38-39.
Universal Display Corporation, "From Passive to Active Matrix", downloaded from Internet Apr. 25, 2002, http://www.universaldisplay.com/matrix.php 2 pages.
Universal Display Corporation, FOLED Flexible Organic Light Emitting Device, downloaded from Internet Apr. 25, 2002, http://www.universaldisplay.com/foled.php 2 pages.

* cited by examiner

GAMING MACHINE REEL HAVING A ROTATABLE DYNAMIC DISPLAY

CROSS-REFERENCE TO RELATED APPLICATION

This application is a continuation-in-part and claims the benefit of U.S. application Ser. No. 09/964,962, entitled "Gaming Machine Reel Having A Flexible Dynamic Display", filed Sep. 27, 2001 now U.S. Pat. No. 8,002,624, which is hereby incorporated by reference in its entirety for all purposes.

FIELD OF THE INVENTION

The present invention relates to gaming apparatus commonly known as slot machines, and more particularly to a rotatable dynamic display panel provided on the reels of slot machines to produce various indicia.

BACKGROUND OF THE INVENTION

Conventional slot machines are gaming devices that incorporate a plurality of reels, typically three, rotatable about a common axis. Each reel has multiple indicia printed on the periphery depicting specific symbols relevant to game play. A player initiates a play on a slot machine by, for example, pulling a lever or depressing a triggering button. Upon initiating a play, a random number generator generates a first number, which in turn corresponds to an indicium or symbol. The first reel is then stopped to display the selected indicium. In a similar fashion, the second and third reels display indicium corresponding to second and third numbers generated by the random number generator. After the reels have stopped spinning, the microprocessor evaluates the outcome of the first, second, and third generated random numbers to determine if there is a winning combination. When a play concludes with a winning combination being displayed, a payout may be awarded to a player.

In a traditional, three reel, mechanical slot machine, each reel might have, for example, twenty-two stops or indicia that can be displayed as part of a multiple reel payline combination. The probability for paying off on a specific combination of indicia is dependent upon the number of reels in play, the number of symbols on each reel, and the number of winning symbol combinations. For instance, the lowest probability, one in which there is only one winning combination, can be mathematically represented as $1:N^R$ where N is the number of indicia on each reel and R is the number of reels. Therefore, for a traditional, three reel, mechanical slot machine having twenty-two symbols, the lowest probability that can be obtained is $1:22^3$ or 1:10,648. Thus, for the slot machine to be commercially viable, the maximum jackpot payable by such slot machine is limited to the amount that could be paid one in every ten thousand six hundred forty eight plays.

As today's slot machine players become more sophisticated, the market demands higher payouts and greater game variation to maintain and increase player appeal. To allow for higher purses, and still remain commercially viable, a traditional slot machine can either increase the number of symbols per reel, or alternatively add reels to the machine. Both alternatives, however, have proven undesirable effects. For example, it is difficult to provide more than about twenty-five symbols per reel because for the symbols to remain readable the diameter of the reel is too large to fit within the physical dimensions of the standard-sized slot machine. Similarly, it has been observed that slot machines having more than three reels are less appealing to slot machine players.

One alternative technique for increasing the jackpot size in slot games employs a "virtual reel," described in U.S. Pat. No. 4,448,419 to Telnaes. In general, a "virtual reel" is a software program that allows a slot machine to increase the payout without increasing the number of reels or the number of symbols per reel. The virtual reel software program contains instructions that map a number of virtual symbols to physical symbols on the slot machine reel. For example, a virtual reel may contain forty-four possible virtual symbols with each virtual symbol corresponding to one specific physical symbol on a twenty-two symbol reel. Therefore, in this example, the virtual reel effectively raises the lowest probability that can be obtained to 1:44³ or 1:85,184, which greatly increases the available largest payout.

During a typical virtual reel slot machine play, a slot player initiates spinning of the slot machine reels through any number of means, including pulling a handle. The "virtual reel" software program then randomly selects a symbol from the virtual reel, all while the physical reel is spinning and observable by the player through a display glass. A control circuit then causes the spinning reel to stop at the symbol selected by the software. Therefore, the software controls the actual outcome of the game and the physical reel merely acts as a display device.

Another alternative technique for increasing the jackpot size in slot games employs a slot machine reel with luminescent display elements. This technique is detailed in U.S. Pat. No. 6,027,115 to Griswold et al. In general, slot machines utilizing the luminescent display element technique contain reels in which "symbol regions" contain electroluminescent elements. Multiple electroluminescent elements may be arranged in each symbol region to allow a given symbol to be displayed in multiple formats, with each format representing an independent indicia for payout purposes. For example, a "7" symbol could be displayed with its outline illuminated, with interior cross hatching, with a combination of cross hatching and outline illuminated, or with different colors. Thus, each possible symbol may appear to a player to be different physical symbol, despite the fact it exists within the same physical symbol region. By utilizing this technique, or by combining this technique with a virtual reel, the designer has still greater flexibility in creating higher odds and offering a much larger payout.

One drawback to either a virtual reel or a reel containing an electroluminescent display is that the slot machine game play is still limited by the number of unique symbols that can be displayed by the physical reel. In other words, in utilizing a traditional physical reel with twenty-two symbols, a virtual reel can display, at most, twenty-two unique symbols. Similarly, while an electroluminescent reel may increase the number of unique symbols possible, the electroluminescent reel is also limited by the number of unique luminescent patterns. Still further, if the owner of the slot machine utilizing either technique wishes to change the gaming symbols, the slot machine reels must be physically replaced, resulting in extremely costly "down-time" for the machine and consequently lost revenue for the owner.

To allow a gaming machine with an infinite number of display symbols, game manufacturer's have utilized flat, rigid panel displays, (i.e., liquid crystal displays ("LCDs"), or light emitting diode ("LED") displays) similar to a display of a computer screen. By utilizing a rigid display panel, a computer processor is able to create, display, manipulate and control a "virtual slot machine" without any mechanical spinning reels, further allowing for an infinite number of possible symbol displays and increased payouts. However, while the use of the virtual slot machine has proven popular in today's personal computer market, it has not met with much success in casinos, as a slot machine player desires the visual stimulation, and excitement of a traditional, spinning reel slot machine.

SUMMARY

The invention is directed to a gaming apparatus reel having a motor capable of rotating said reel operatively coupled to a controller to control a reel rotation speed, a support mechanism coupled to the motor having an outer circumferential region, a display mounted on the outer circumferential region operable to rotate about an axis of the reel. The display may comprise of plurality of pixels and an associated display controller. The pixels may be utilized to form symbols or indicium used in a play of wager-based game. In various embodiment, each of the plurality of pixels may be implemented using various display technologies such as 1) a plurality of electrically charged microcapsules suspended in a carrier medium, and a circuitry layer coupled to the film layer configured to apply an electric charge to the plurality of electrically charged microcapsules, 2) a plurality of liquid crystals, 3) a plurality of light-emitting elements, such as LED and 4) combinations thereof.

The display may be comprised of one or more flexible or rigid elements where the display is configured to dynamically display the indicium or symbols at a first predetermined time and at a predetermined position, which may be affected by the reel rotation speed. The display may be configured to output still images or video images, such as animations. When a reel is rotating, the position of the indicium as a function of time and its associated pixels, may be fixed relative to the rotating portions of the reel assembly, such that the indicium appears to rotates at the same rate, as the reel assembly. In other embodiments, while a reel rotating, the pixel locations used to render a particular indicium may be varied, such that the indicium appears to rotate at different rate then the underlying reel.

In particular embodiments, a reel may comprise one or more displays where at a particular time only a portion of the one or more displays are visible through a viewing window associated with the gaming apparatus. The portion of the one or more displays that are visible through the viewing window may change as the reel rotates. The gaming apparatus may be operable to determine pixel locations on the one or more displays that are visible through the viewing window at a particular time. Further, the gaming apparatus may be operable to determine pixel locations on the one more displays that correspond to paylines associated with the viewing window. In one embodiment, indicia are not rendered on a portion or portions of the one or more displays that are not visible through the viewing window. In addition, indicia may only be rendered on portions of the one or more displays that comprise at least pixel locations that are viewable through the viewing window.

In particular embodiments, a display mounted to a reel may comprise pixel elements that require a power input to remain visible. For instance, liquid crystal displays require a charge to maintain a pattern in the liquid crystals. Each reel may include an alternate power source or may be coupled to an alternate power source, such that in the event of a power failure, the display is provided with power, to allow indicia rendered on the display to persist for some time period after main power is lost. Two examples of alternate power-sources that may be utilized are a capacitor or a battery. In one embodiment, the alternate power source may be mounted to the reel assembly.

A method for displaying a game play on at least one gaming machine reel provides for determining a plurality of indicia to display on a reel at a particular time, determining a position of one or more displays relative to a viewing window, determining pixel locations and associated pixel ranges for displaying each of the plurality of indicia on the one or more displays and transmitting instructions to at least one display controller to display the plurality of indicia on at least one reel at a first predetermined time and at a predetermined position while the reel and the associated displays are rotating about an axis. The position of the one or more displays relative to the viewing window may change as the reel is rotated. In some embodiments, one or more of the plurality of indicia may be rendered to not rotate at the same rate as the one or more displays are rotating. Thus, while the reel is rotating, the pixel locations and associated pixel ranges for displaying a particular indicium may change relative to a particular display or displays.

In one embodiment, while the reel and display mounted around the outer circumference are rotating, an indicium may be rendered such that it appears to remain visible within the viewing window for a longer time period than that it would if the indicium where rotating at the same rate as the reel. In a particular embodiment, the indicium may be rendered such that, while the reel is rotating, it appears to remain in a substantially static position, relative to the viewing window. In another embodiment, an indicium may be rendered such that it appears to remain visible within the viewing window for a shorter time period than that it would if the indicium where rotating at the same rate as the reel.

In certain embodiments the devices and methods described herein include, but are not limited to any combination of two or more, three or more, or four or more, of the elements or features described above and/or any combination of two or more, or three or more, or four or more of the elements or features described herein.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

DETAILED DESCRIPTION

Embodiments are described herein in the context of a gaming machine including a rotatable reel having a curved dynamic display. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings.

Figure 1:
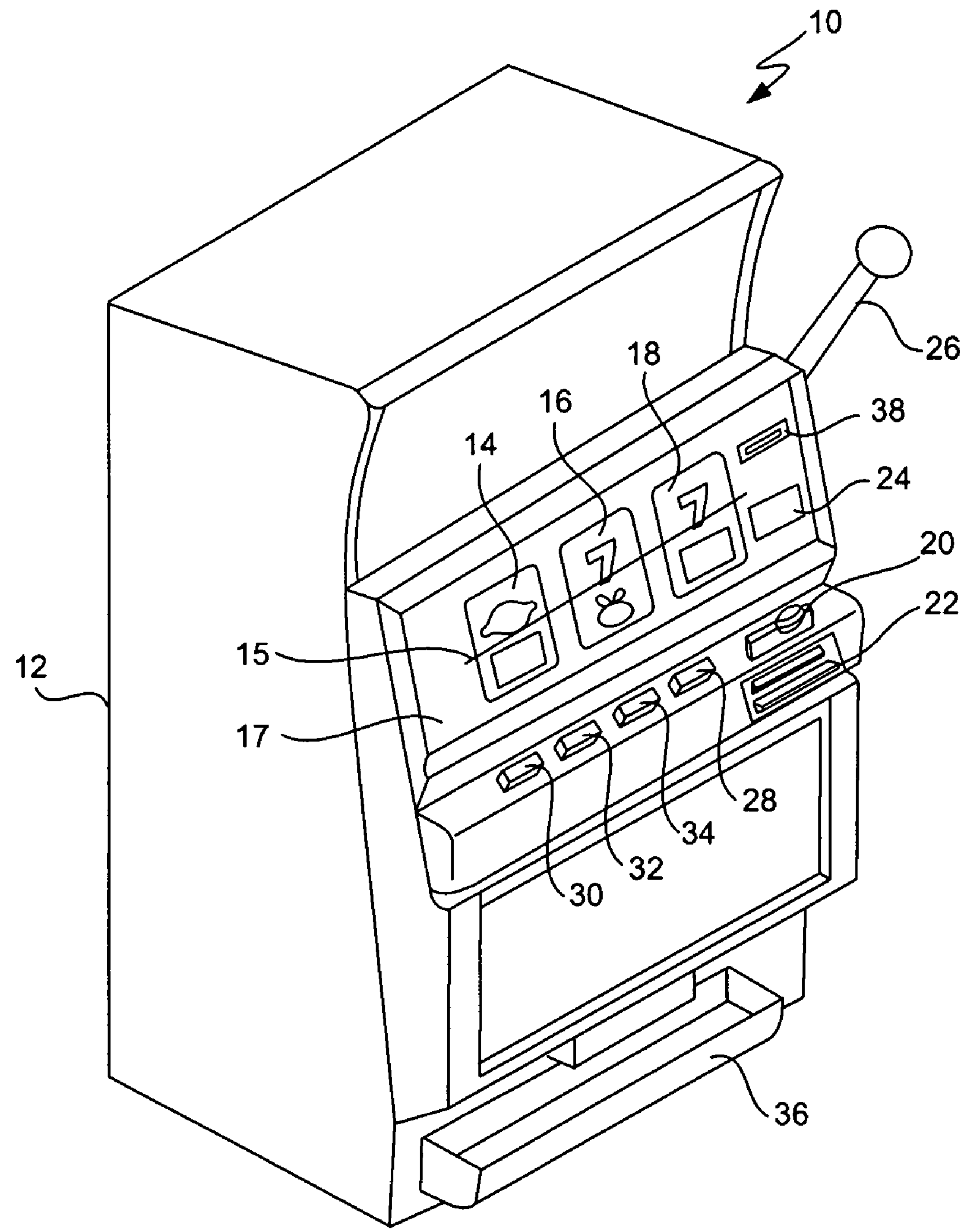
FIG. 1 is a perspective view of one embodiment of a slot machine with reels.

Turning now to FIG. 1 there is illustrated an embodiment of a slot machine 10. Slot machine 10 may include an exterior housing 12, a plurality of reels including pixilated displays, which may be designated as a first dynamic display reel 14, a second dynamic display reel 16 and a third dynamic display reel 18. Slot machines with more or less dynamic display reels may be utilized. Further, not all of the reels may include pixilated displays. For example, one of the reels, such as 14, may be a dynamic display reel, while the other two reels 14 and 16 may include traditional static reel strips mounted about an outer-circumference of the reel.

The plurality of reels, 14, 15 and 16, may be utilized to display an outcome to game of chance. The game of chance may be initiated after a wager is made on an outcome to the game of chance. A gaming controller (not shown) may generate one or more random numbers to determine an outcome to the game of chance. Then, each the reels may be rotated for a time period according to a rotation profile, which may be determined, and then the reels may be brought to a rest. When the reels are brought to rest, symbols may be displayed in a particular position, such as aligned with the payline 45. The combination of symbols aligned with the payline 45 may be used to indicate the outcome to the game. The symbols may also be referred to as indicia.

Traditionally, symbols for a reel have been printed on a rectangular shaped media that is wrapped around the outer circumference of the reel. The rectangular shaped media is often referred to as a reel strip. A number of symbols that are printed on a reel strip may depend on a size of each symbol, where a lower bounds on the size of each symbol may be specified so that the symbol is easily readable, and a diameter of the reel where the diameter of the reel may be limited by the size of the cabinet 12. A reel is usually configured such that once a reel strip is mounted to the reel, the position of each symbol on the outer circumference of the reel is fixed and the relative position of each symbol relative to one another is fixed.

A described above, a dynamic display configurable to display various patterns may be utilized instead of a printed reel strip to present symbols or indicia that are visible through reel mask 17. The reel mask 17 is typically employed so that only a portion of the reel strip and associated reel assembly of each reel are visible from the front of the slot machine 10. The position of each symbol that is rendered on a dynamic display doesn't have to remain fixed relative to the outer circumference of the reel. At a first time, a first symbol may be rendered at a first location on the outer circumference of a reel and at a second time the first symbol may be rendered at a second location on the outer circumference of the reel.

Slot machine 10 may further include a first slot or opening 20 for accepting tokens, coins or any other suitable elements that may or may not be representative of monetary value, a second slot or opening 22 for accepting various denominations of paper currency and/or tickets and a credit display 24 for displaying game information such as the amount of credits available for wagers on the slot machine. The gaming machine may also include a ticket printer (not shown). The slot machine 10 may also include a handle or arm 26 and a spin button 28 (either of which may be referred to as a spin actuator), a number of buttons 30, 32 and 34 that a user may actuate to make bets or wagers, and a payout tray or hopper 36. The slot machine 10 may further include a player tracking slot 38 for accepting various devices that hold information relative to player tracking, such as a debit card, a smartcard, or the like, including cards that include a monetary value.

Figure 2A:
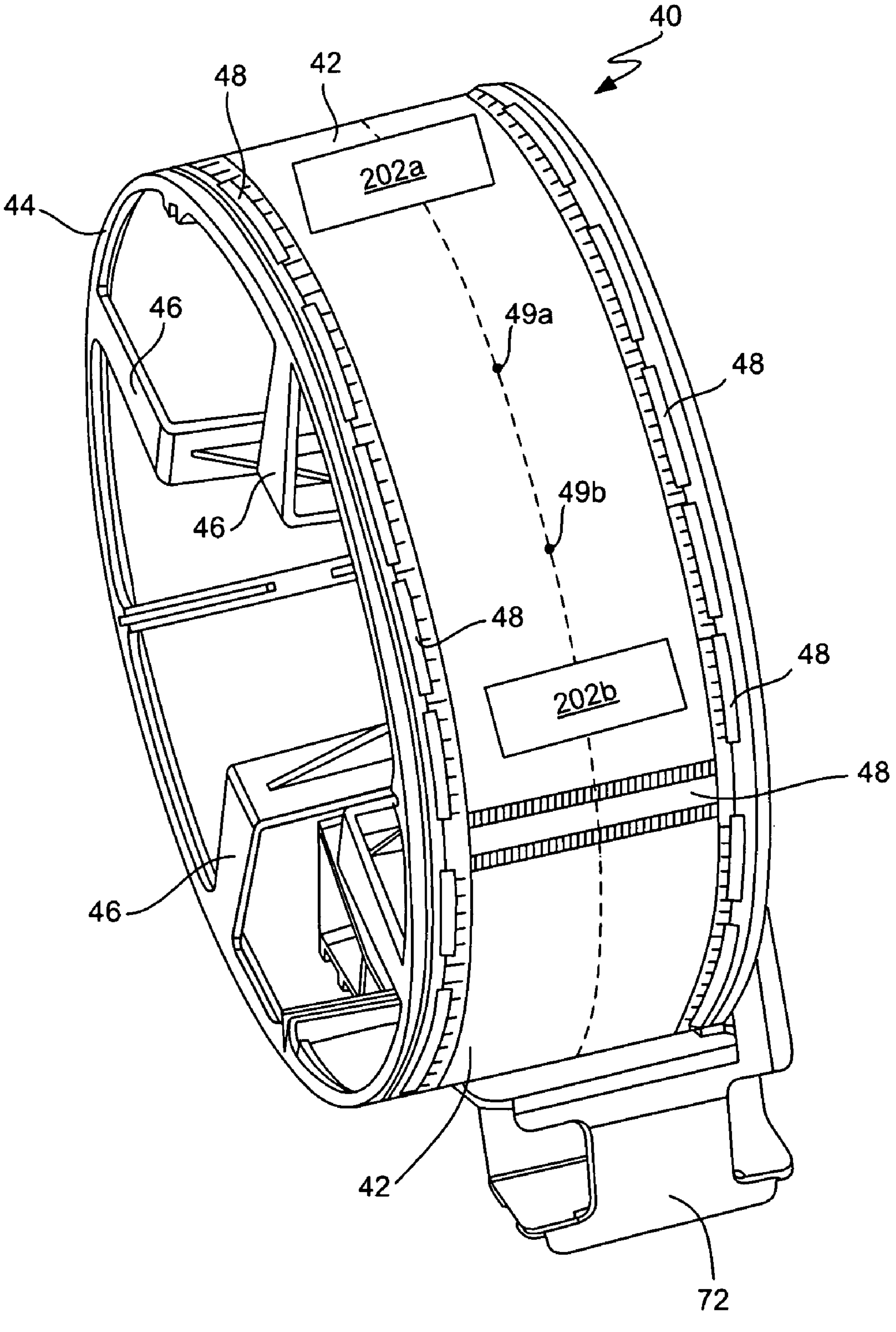
FIG. 2A illustrates a reel including a display.

Turning to FIG. 2A, there is depicted a reel 40 in accordance with one embodiment of the present invention. As illustrated, the reel 40 may include a display panel 42 mounted to an outer circumference 44 of an internal structure 46 of reel 40. The display panel 42 may be shaped to mount to the outer circumference 44 of reel 40. In one embodiment, the display panel 42 may be implemented on a flexible substrate. A curved display panel implemented on a rigid substrate may also be utilized. One example of a flexible display panel 42 is a LCD panel described in U.S. Pat. No. 6,016,176 to Kim et al. Another example of a flexible display panel 42 is a Flexible Organic Light Emitting Device ("FOLED") developed by Universal Display Corporation, Ewing, N.J. Other display technologies that may be utilized include but are not limited to an "E-ink" type displays and polymer organic light emitting diodes. In particular embodiments, the display may be a color display including color pixels.

The present invention is not limited to round reels. In other embodiments, a rotatable structure having an outer perimeter with one or more displays mounted to the outer perimeter may be utilized. The rotatable structure may be driven by a motor to allow it to rotate about at least one axis of rotation. As an example, the rotatable structure may comprise an octagon-shaped perimeter with display elements mounted around the outer perimeter.

As described above, the display panel 42 may also comprise a plurality of pixels such as the use of electronic ink as developed by E Ink Corporation, Cambridge, Mass. The electronic ink may be printed onto a sheet of plastic film that is laminated to a layer of circuitry. The sheet of plastic film may be flexible, similar to a printed reel strip. The circuitry layer controls the pixels to form a pattern of pixels that results in the symbols to be displayed on the flexible display panel. The circuitry layer may be controlled by the display driver, such as **202*a* or 202*b***.

For E-ink displays, the plurality of pixels may be microcapsules suspended in a liquid "carrier medium" allowing them to be printed using existing screen printing processes onto virtually any surface, including glass, plastic, fabric and paper. The microcapsules contain positive and negatively charged particles. For exemplary purposes only and not intended to be limiting as any color may be used, the positively charged particles may be the color white and negatively charged particles may be the color black, both of which may be suspended in the liquid carrier medium. When a negative electric field is applied, the white particles move to the top of the microcapsule and are visible to the user. This makes the surface on the display panel 42 appear white at that spot. At the same time, an opposite electric field pulls the black particles to the bottom of the microcapsules where they are hidden. By reversing this process, the black particles may be moved to the top of the capsule, which now makes the surface appear dark on the surface of the display panel 42. The application and/or removal of electric charge to each of the plurality of pixels forms the symbols displayed on the display panel 42.

Some display technologies, such as LCD's or E-ink, may require back-lighting for visibility purposes. Other technologies may require front lighting or may benefit from front lighting to enhance visibility. The backlighting and/or front lighting sources may comprise one or more of incandescent, fluorescent, LED elements, fiber optic, light pipes or combinations thereof. Each of the lighting sources may comprise one or more lighting elements, such as an array of LED elements or a bundle of light pipes. Further, lighting may be provided indirectly via reflection off a surface, such as off of a mirror or diffusively through a surface, such as through a translucent material. These elements may be mounted to the reel 40 and/or to a gaming machine cabinet in which the reel is mounted. Further, each of the elements may be designed or configured to emit light at various frequencies and intensities. In some embodiments, the backlighting elements may be mounted to the reel assembly and may rotate as the reel assembly rotates.

Backlighting, such as LED backlighting, may be used to provide certain effects, such as changing colors, providing a strobe affect, highlighting or outlining a particular symbol and simulating sparkles or fireworks. These effects may be generated in combination with symbol rendering including animations provided on one or more of the displays. In addition, front lighting may be also used in some implementations to provide these type of features.

The reel 40 may further include one or more integrated circuits 48 which process appropriate data to control the activation of pixels to display the various indicia. One or more display drivers, such as 202*a* and 202*b*, may be associated with each display. For example, LCD panels often have complex voltage requirements. The voltage inputs may be controlled by the display drivers.

In some embodiments, the display drivers may be mounted as part of the rotating reel assembly 46. The circuitry, such as 48 and 202*a* and 202*b*, allow the various pixels of the display 42 to be addressed, activated and refreshed. Typically, each display panel, such as 42, may comprise an array of addressable pixels. The size of the array depends on the resolution of the display. The displays may be used to output symbols or indicia that may be used to form various symbols or indicia that may be utilized in a wager-based game of chance. Further, the displays may be used to output still images or video data, such as an animation sequence or video data, associated with television programming or a movie. In one embodiment, the displays may be utilized with a touch sensor. For example, the reel mask 17 in FIG. 1 may include a touch sensor that allows images, such as buttons, displayed on a reel display to be selected.

The display 42 may not be a single display, but, may comprise a plurality of displays each with a separate array of addressable pixels and associated control circuitry. For example, a first display may be mounted about a first half of the circumference of reel 40 and a second display may be mounted about the second half of the circumference of reel 40. Further, in some embodiments, the display 42 may not span the entire circumference of reel 40. For instance, displays and printed media may be interspersed around the circumference of reel 40, such that a first portion of the circumference of the reel comprise displays and a second portion of the circumference of the reel comprises printed symbols.

In other embodiments, different display technologies may be utilized at different locations around the circumference of reel 40. For example, the reel 40 may utilize a combination of OLED and E-ink type displays where the OLED and E-ink displays at different locations around the circumference of the reel. In another example, across the reel 40, strips of E-ink displays may be used at the edges of the reel, while another display technology, such as an OLED display may be used in the center of the reel, such as centered on the line with points 49*a* and 49*b*.

In yet other embodiments, the displays may comprise multiple layers, such as multiple OLED or LCD layers that may be controlled to output images. In one embodiment, a multiple layer display may used to add an appearance of "depth" to displayed information. Details of multiple layers displays and associated methods and apparatus that may be utilized with a rotating display are described in co-pending U.S. application Ser. No. 11/938,151, filed Nov. 9, 2007 and titled, "Presentation of Wheels on a Gaming Machines Having Multi-Layer Displays," and U.S. application Ser. No. 11/983,770, "Multilayer display 3D Server Based Portals," filed Nov. 9, 2007, each of which is incorporated by reference and for all purposes.

The use of pixels allows for the flexibility to display the symbols on the display panel 42 in various dynamic and animated ways. For example, the symbols may appear animated for regular or bonus play games. Furthermore, the symbol may be mapped on the rotatable display panels of each reel sequentially such that it would make the symbol appear to be moving from one reel to another. To a player, the symbols would appear to be jumping from one reel to the next. Further, the display panel 42 may be used to display advertising or attract features.

In another embodiment, a gaming controller may be designed or configured to combine pixel addresses from one or more rotatable displays to form a single "virtual" display. For example, a single image may be generated, such as an image for an attract feature and then output to 3 rotatable displays across three different reels. The image may be partitioned such that a portion is rendered on each of the 3 rotatable displays as if the 3 rotatable displays were a single display. In yet another embodiment, a gaming controller or other control device may be able to control a shared rotating display, such as a giant reel or set of reels shared by a bank of gaming machines. Thus, methods an apparatus described here are not limited to only rotating displays used in lieu of a traditional mechanical slot reel.

In particular embodiments, the size of one or more symbols may be varied. For example, players with poor eyesight may want the symbols to be enlarged. Or to attract attention to a symbol, it may expand or contract while it rotates. Further, to expand the size of reel strip rendered around the circumference of a reel, the size of the symbols may be decreased to allow more symbols to fit around the circumference of the reel when the symbols are rendered at fixed locations around the circumference of the reel.

In some embodiments, a player may be allowed to select a number of symbols to utilize for a particular game and hence change the odds and awards associated with the slot game. This flexibility allows for the possibility to increase or decrease the probability for payoff on a certain or predetermined combination of indicia on the rotatable display panel 42. When increasing the size of the symbols, fewer symbols may be displayed on the display panel, which increases the probability of a payoff for a predetermined combination of indicia. Alternatively, decreasing the size of the symbols will allow for more symbols to be displayed on the rotatable display panel, which decreases the probability of a payoff.

In particular embodiments, the number of symbols used from reel to reel may be varied. For example, one reel in a three reel slot game may include more indicia that are used in award combinations than the other reels or all three reels may have different numbers of indicia. These sets of indicia may be player selectable. In some embodiments, the gaming machine may be operable to add or subtract one or more indicia that are displayed on each reel. For instance, a special bonus symbols may be added or removed from the reels where different award combinations are triggered from the presence of the special bonus symbols.

For example, a player may be awarded a special bonus symbol that may be added to a reel, such as 40, during game play. The special bonus symbol, such as a bonus multiplier, may replace an existing symbol or may be added to the "reel strip" associated with reel to increase the number of symbols on the reel. When the special bonus symbol appears on the reel, alone or in combination with other symbols, an award may be indicated. In another example, a player may be able to purchase a special bonus symbol to add. Also, the player may be able to redeem player tracking points to purchase the special bonus symbol to add.

In other embodiments, special symbols may be added or removed as part of a communal gaming application. For example, a plurality of gaming machines with rotatable reel displays may be linked together where an event occurring one of the machines may trigger a special symbol being added to all of the machines linked together. In another example, players may be able to trade or share symbols that may be added to a reel strip.

In general, during the play of a game, the number of symbols associated with the reel may change over time, increasing or decreasing. For example, a symbol associated with a negative outcome occurring may be shown being removed from the reel. Further, the frequency of symbols may change increasing or decreasing. For example, a symbol associated with a losing outcome could be changed to a symbol associated with a winning outcome. In either case, the number of symbols changing or the frequency of symbols changing may be associated with the probability of a particular outcome occurring or may be changed only for presentation purposes with no change in the probability of a particular outcome occurring.

Traditionally, the number a symbols on a mechanical reel is associated with a number of reel stops for the reel where a symbol or a blank spot on the reel strip is located at each reel stop. In one embodiment, utilizing the rotating displays, reel stops may split or merge to add or delete symbols. For instance, a number of reel stops may be reserved for the portion of a rotating display that is visible in a viewing window, such as 5 stops. During game play, these stops may be dynamically changed. For instance, all 5 stops and their associated symbols could be merged into a single stop with a single symbol. As another example, one of the 5 stops could be split into two or a plurality of segments to allow additional symbols to be rendered.

In traditional mechanical reel devices, the spacing between stops is fixed. As described herein, the spacing between stops may be varied and may be dynamically changed. For instance, at one time, during a game 5 visible reel stops may be equally spaced. At another time, one of the reel stops may have a spacing that is larger than the other 4 reel stops that are visible and a larger symbol may be rendered at the reel stop with the larger spacing. A magnifying feature may be provided that allows a symbol rendered at a reel stop with a small spacing, such as when a single reel stop is split into a plurality of stops, to be viewed, i.e., a zoomed in view of the symbol may be rendered on the rotating display.

In general, the magnifying feature may provide zoomed-in or zoomed-out view of symbols. In one embodiment, a user or an operator may be able to select a magnification level for one or more symbols. For example, the user may select a default magnification for all the symbols or just special symbols, such as bonus symbols. The default magnification may be different for different symbols. These user selections may be stored or recorded so that the game is automatically set-up with the symbol magnifications selected by the user. For example, the user selection may be stored on a device, such as a printed-ticket, cell phone or smart card that is interfaceable with the gaming device providing the game or may stored in a remote account that is accessible to the gaming device in response to account information and/or identification information provide by the user.

In yet other embodiments, symbols may dynamically morph from one symbol to another symbol. For example, the symbols associated with a slot game may be morphed into playing cards for use in a card game. The rotating displays are not limited to displaying only slot games. Card games, keno games, bingo games and other bonus games may be output on a rotating display.

In other embodiments, as is described in more detail with respect to FIGS. 2B-2F. The symbol size may be decoupled from a circumferential size of the reel by changing the sequence of symbols rendered around the circumference of the reel over time. In a traditional reel, the game symbols (also, referred as indicia as described herein) are at fixed location around the circumference of the reel once the reel strip is installed around a reel. If a reel rotates in a particular direction depending on the size of the reel and the rotation rate of the reel, a particular symbol reappear in a viewing window at certain intervals. With a dynamic reel display, a number of symbols and a symbols size may be defined for a reel strip that if rendered on a printed reel strip would no longer fit around the circumference of the reel 40 and thus, would not suitable for use with reel 40. However, using display 42, by changing the symbols displayed on reel 40 as a function of time, all of the symbols on this "virtual" reel strip may still be displayed. Additional details of methods and apparatus associated with a virtual reel strip on a video display gaming machine that may be employed herein are in co-pending application Ser. No. 10/674,884 to Kryuchkov entitled "3-D Reels And 3-D Wheels in a Gaming Machine", which is incorporated herein in its entirety for all purposes.

The symbols may be varied and personalized to the player and/or game of chance played. The symbols may change based upon a certain event occurring, the game of chance played, player preferences, and the like. For example, a specific symbol(s) may be used upon a bonus event for the game of chance played, represent an increase in rewards, display player tracking points, or the like.

While the slot machine reel 40 of FIG. 2A is depicted with one display panel 42 mounted to the outer circumference 44, it will be understood by those of ordinary skill in the art that multiple display panels may be mounted to the outer circumference, for instance, two, three, or four, etc., display panels 42 may be mounted to the outer circumference 44. In another embodiment, the reel may be a single elongated tube. For instance, the reel 40 may be expanded in width and rather than having 3 or more separate reels with separate motors a single reel may be utilized with a single motor.

The use of an elongated tube allows for the flexibility of segmenting the tube a varying number of reels. The elongated tube may be segmented into, for instance, three, five, eight, or more reels may be created. In one embodiment, dark areas may be rendered on the display to denote a boundary between reels. In another embodiment, a mechanical ring may be positioned over the tube to highlight the segmentation or division between the reels. In particular embodiments, a gaming machine may be configured to allow a player to select a number of reels they would like to play in the game of chance. In yet other embodiments, the number of reels may be varied during game play. For instance, a reel may appear to merge into another reel during game or may appear to split from another reel during game play, increasing or decreasing a number of reels that are rendered. Further, the number of paylines that may be implemented may vary which may also vary the probability of a pay out.

Recognizing that known non-flexible display panels may have some "flexibility," i.e., they may be bent a small amount, it will be understood that the term "flexible display panel," as used herein means that the display panel 42 may be capable of being bent, turned or forced from a substantially straight line or form without breaking and without compromising the display quality associated with well known, non-flexible LCD or LED display panels, to conform to the outer circumference of the slot machine reel 40. For example, if two points 49*a* and 49*b* are placed on the outer circumference 44 of the slot machine reel 40 and separated by an angular displacement of at least about ten degrees along the circumference, the rotatable display 42 would be capable of bending or flexing to contact the two points without breaking and without compromising the display quality associated with well known, non-flexible display panels. In another example, if four display panels 42 are consecutively mounted on the outer circumference 44 of the slot machine reel 40 and the two points 49*a* and 49*b* are separated by an angular displacement of about ninety degrees, a first end of one of the flexible display panels 44 would contact the point 49*a* and a second end would contact the point 49*b*.

It is important that displayed symbols are correctly aligned with associated paylines. If the paylines are drawn across a view window, then it may be important to ensure that rendered symbols, are aligned with the paylines on the viewing windows to avoid disputes associated with a rendering of the symbols. Thus, the reel 40 may include or may be coupled to one or more sensors that allow an orientation of the reel 44 and its one or more associated displays to be determined. Details of methods and apparatus that may be utilized to verify an orientation of a reels as well as a functioning of slot reels in general are described in co-pending U.S. application Ser. No. 11/181,093, titled "Method and Apparatus for Independently Verifying Game Outcome," filed Jul. 13, 2006," and U.S. Pat. No. 6,394,900, "Slot Reel Controller as a Peripheral," filed Jan. 5, 2000, each of which are incorporated by reference in their entirety and for all purposes.

In one embodiment, one or more payline segments, which may comprise one or more lines at varying angles, may be associated with each symbol that is rendered on a rotating display 40, such that when the game outcome of a game is displayed on one or more rotating displays the payline segments across symbols used to render the outcome may line up to form one or more paylines. In another embodiment, a payline pattern may be determined based upon a player's wager (i.e., one or more paylines may be selected by the player) for a 3 reel game comprising 3 rotating displays. When a final symbol combination is mapped to the 3 reels that is used to display the game outcome, a payline pattern may be drawn over the final symbol combination that allows the relationships between various symbol combinations to be visually determined, such as lines connecting two or more symbols. For multiple paylines, the paylines may be drawn simultaneously, individual, in groups or combinations thereof.

Various combinations of sensors may be used to determine a position of a reel. The sensors may be used to verify a location of a particular location of an outer circumference of reel 40 relative to a viewing window associated with a gaming machine at a particular time. As example, sensors, such as one or more optical sensors or imaging devices, such as a camera, may be mounted on reel or inside a gaming cabinet to determination an orientation of a reel and its associated displays relative to a viewing window. For example, an optical sensor, such as a bar-code scanner, may be used to read symbols disposed on an inner surface or an outer surface of the rotating portion of the reel 40 depending on the location of the optical sensor. As another example, a camera in combination image recognition software may be used to recognize symbols disposed on the reel structure 44 or generated on the display. In one embodiment, a camera may be used to record a history of symbols displayed on a reel at a particular time.

In one embodiment, a gaming machine may include one or more calibration algorithms. For example, a gaming controller associated with a gaming machine may be operable to command a reel to rotate to a particular position, render a particular symbol a particular location on a display, such as a line, and determine, using a camera, whether the line on the display is aligned with a marking on edge of reel. If the line on the display doesn't match the marking, then the line may be redrawn until it matches, at which the pixel locations on a display relative to the marking could be determined. In another example, an optical sensor could be mounted in a known orientation and then line patterns drawn at the top and bottom of the one or more displays, then the display could be rotated to until the symbol patterns are read, at which point, the top and bottom of each display could be determined relative to the reel position could be determined.

The rendered text and symbols displayed on the reels are not necessarily planar and may be rendered in multiple dimensions in a 3-dimensional (3-D) gaming environment. Thus, text and symbols rendered on display 42 may appear to rotate, translate, vibrate, change shapes and combinations thereof while the display 42 is rotating. The symbols displayed for a game of chance may be rendered on a particular surface and may change with time in response to various player inputs. As an example, reels on a slot display rendered in the gaming environment may begin to spin in the gaming environment in response to a player pulling a lever or depressing an input button on the physical gaming machine. Implementations of a virtual 3-D gaming environment is discussed in detail in co-pending application Ser. No. 10/674,884 to Kryuchkov entitled "3-D Reels And 3-D Wheels In A Gaming Machine", which is incorporated herein in its entirety for all purposes.

The reel 40 may appear as though is has a "virtual circumference" bigger than the circumference of the actual reel circumference of reel 40. The virtual circumference refers to method whereby the symbols displayed on the reel may be changed as a function of time as they are sampled from a sequence of symbols. The number and size of the symbols in the sequence of symbols may be too large to allow them to be rendered simultaneously on reel 40. However, since the symbols may be changed over time, as viewed through a viewing window, it may be appear as though a reel with a "virtual circumference" that allows all of the number of symbols in the sequence of symbols to be rendered simultaneously is being rotated based upon the frequency in which the sequence of symbols is repeated, i.e., one turn of the reel with the "virtual circumference." This is discussed in more detail in co-pending application Ser. No. 10/674,884, previously incorporated herein.

In other embodiments, symbols may be displayed only on the portion of the reel facing the player and the remaining portions of the reel may remain blank. For example, in a slot machine game, as the reel rotates to a position that is visible to the player, the symbols would appear. As the symbol rotates out of the player's view, the symbol would disappear and no longer be mapped on the rotatable display panel. As such, the symbols are mapped on the display panel only on the positions that are visible to a player. The remaining parts of the display panel may remain blank. This embodiment is described in more detail with respect to FIGS. 2B-2H.

Coordination of the time to display the image relative to the reel rotation speed is important such that the symbols are visible to a player when displayed at a predetermined time and predetermined position on the rotatable display based upon the reel rotation speed. The location of particular pixels on the rotatable display panel 42 relative to the player's view and the rotation rate of the reel 40 must be tracked to ensure the symbol is displayed in a timely fashion. The circuit layer may apply an electric field to a pattern of pixels to display a symbol at predetermined position 202*a* at time $t_1$. As the reel 40 is rotated, the symbol appears to the player. As the reel 40 continues to rotate to position 202*b* at a later time $t_2$, the symbol may disappear from view of the player and the electric field may be removed. Thus, symbols are no longer displayed on the display panel 42 once out of view of the player.

The coordination of the location of the pixels, rotation rate of the reel, and display time may be implemented using a master gaming controller. The master gaming controller may be connected to the display driver to transmit instructions for displaying the symbols on the reel. The display driver, in turn, is connected to the circuitry layer to apply and control an electric charge to display the symbols on the rotatable display panel. Further details of this methodology are described below with respect to FIGS. 2B-2H.

Figure 2B:
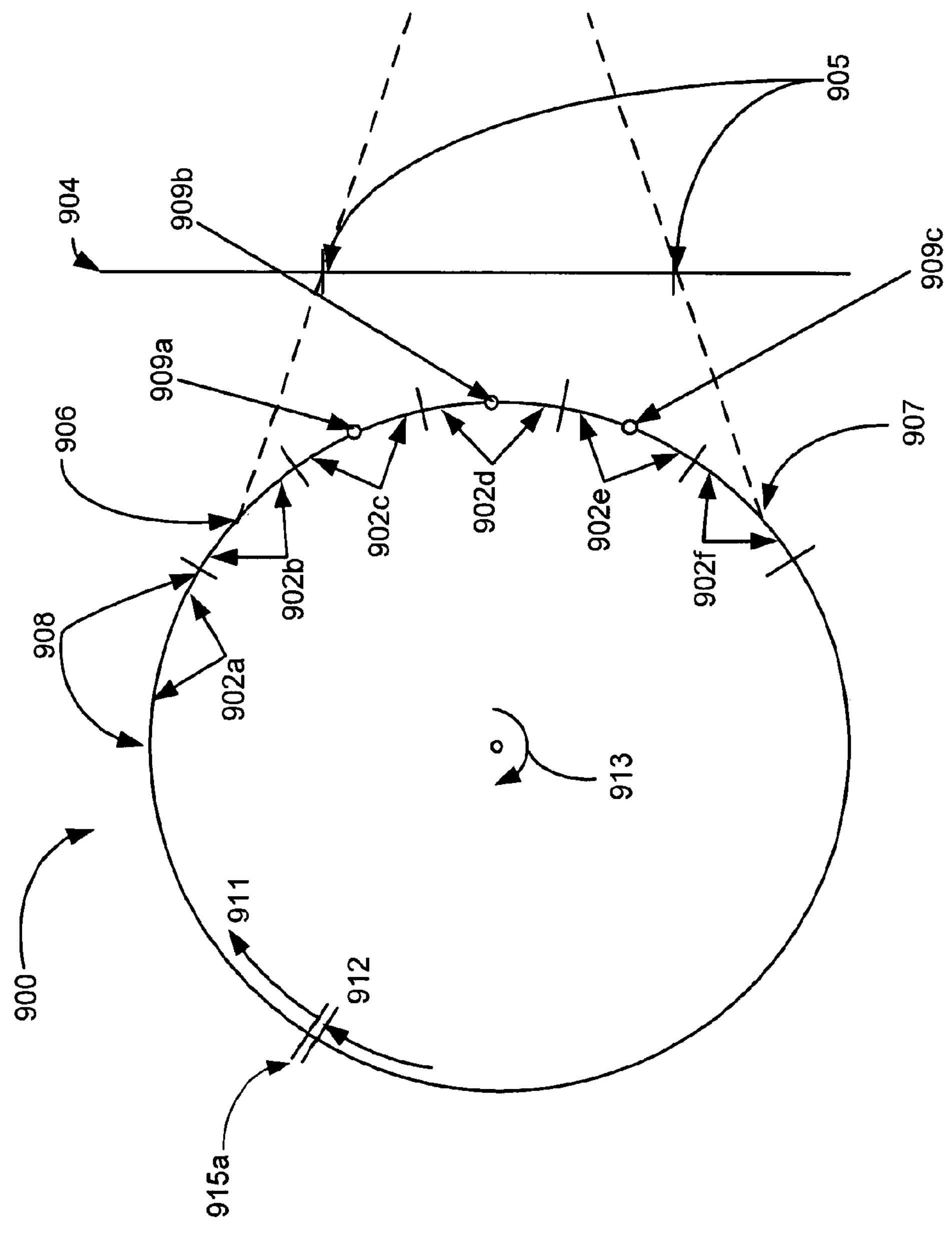
FIGS. 2B-2D illustrate embodiments of a side view of a reel with a rotatable display.
Figure 2C:
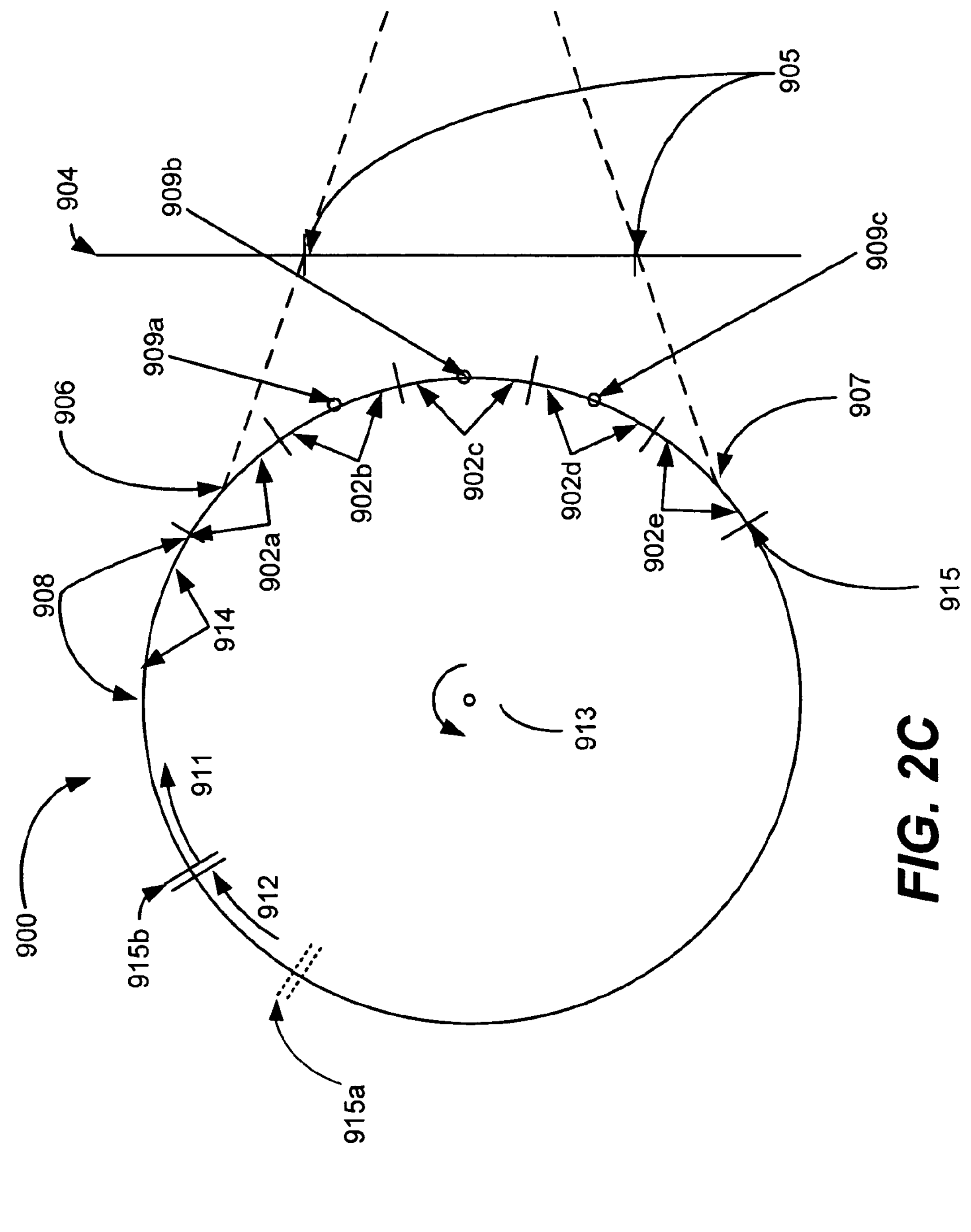
Figure 2D:
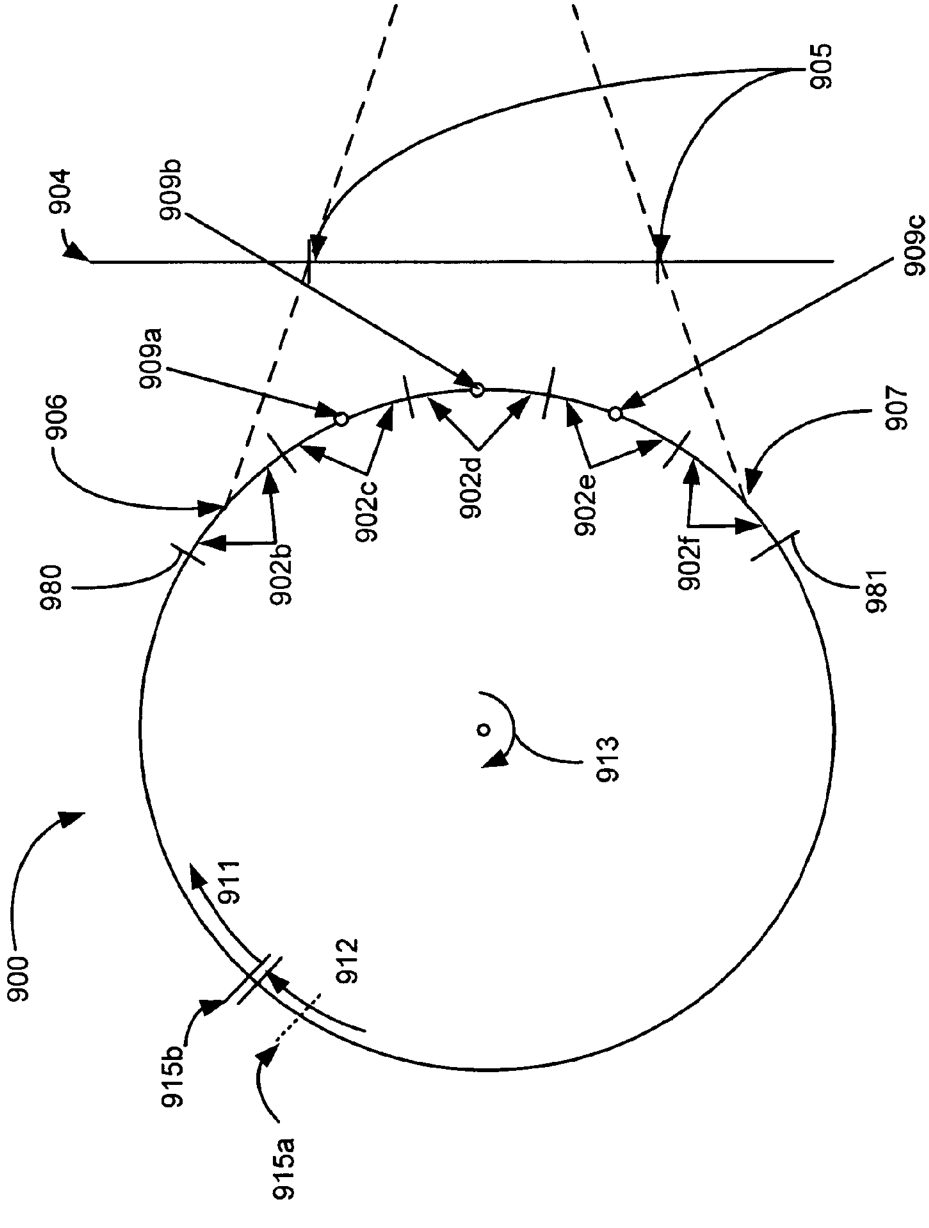

FIGS. 2B, 2C and 2D illustrate a side view of a rotating display 900 at different times. The displays are rotating at rotation rate of 913 about a center axis. In general, the rotation rate may vary with time. The displays may be viewed through a viewing window 905, such as the reel mask 17 described with respect to FIG. 1. The plane of the viewing window 905 is referred to as viewing plane 904. Through the viewing window 905 a portion of the rotating display 900 may be visible. The upper and lower portion bounds of the rotating display 900 that are visible are illustrated as 906 and 907, respectively.

The locations where symbols are to appear on paylines are noted as 909*a-c*. In one embodiment, the paylines may be drawn over the viewing window 905. In another embodiment, the paylines may be drawn as lines on the rotating display 900. In this embodiment, the paylines may be rendered on the reel such that they remain in a constant location as viewed through the viewing window 905 as the display 900 rotates.

In one embodiment, the rotating display may comprise a single display screen wrapped around the outer circumference of a reel device. The start and ending of the pixel addresses for the display are denoted by 911 and 912. The display may be configured such that top and bottom of the portions of the screen overlap to minimize any gap. Nevertheless, since displays typically refresh from top to bottom, at the interface between the top and bottom portions of the rotating display, the top and bottom portion may refresh at different times. The display boundary 915*a* between the top and bottom of the rotating display 900 is at a first position at time, $t_1$.

The gaming machine may be configured to determine at a particular time a portion of rotating display 900 that is visible through the viewing window, such defined by the boundaries of visibilities 906 and 907. In one embodiment, when symbols are rendered such that they rotate at the same rotation rate 913 as the reel, a symbol 902*a* in a sequence of symbols, such as a sequence of symbols defined by a reel strip, may be rendered on a portion of the display just before upper boundary of visibility 906 (If the reel were rotating in the opposite direction, then the symbol 902*a* may be drawn before the lower boundary of visibility).

In this embodiment, the logic device may be configured to determine what pixel locations on the rotating display 900 are before the boundary of visibility 906. As described above, one or more sensors may be used to determine a position of the reel and its associated displays relative to the boundaries of visibility 906 and 907 at a particular time. The pixel locations may be referred to as the rendering zone 908. The size of the rendering zone may depend on the size of the symbol that is to be rendered.

After the symbol is drawn, it may be refreshed at the same pixel locations and allowed to rotate into view between the boundaries of visibilities, 906 and 907. Symbols 902*b*-902*f*, may each be rendered in this manner. The symbols 902*a*-902*f* may be refreshed at the determined pixel locations on the display until the symbols rotate past the boundary of visibility 907. The length of time that each symbol is visible may depend on a rotation rate 913 of the rotating display 900, which may vary with time and which may be zero at the start and end of a game.

For multiple layer displays, as previously described, the determination of pixel locations that are visible may have to be repeated for each display layer. The pixel locations may not be exactly the same for the top and bottom layers. Further, different content may be output on the various layers. For example, paylines on a first layer and game symbols on a second layer or different symbols on a first layer and a second layer, such that when similar symbols align an award or bonus is indicated. For instance, half a symbol may be provided on a first level of the multiple layer display and a second matching half may be provided on a second level of the multiple layer display where the symbols move across the display layers, when the symbols align, an award or bonus condition may be indicated. Symbols may appear to rotate on the different display layers and the display layers may appear to rotate at different rate.

Multiple layer displays may be configured such that when the content on two layers is rendered a 3-D effect is produced.

Thus, in particular embodiments, symbol content may be appear to be rotating in out and of synch on the multiple layers, such that at different times content is aligned to produce a 3-D effect and at other times the content is not aligned such that a 3-D effect is not produced, such as while the rotating display is rotating. The appearance of the 3-D effect may indicate a bonus.

In another example, a bonus payline or bonus paylines may be provided on one or more levels of the multiple layer display. The bonus paylines may appear to rotate in and out of view. When the bonus payline stops at a particular location, such as on a combination of symbols that are visible in a viewing window, then an award may be provided if the combination of symbols on which the bonus payline stopped is a winning combination.

FIG. 2C illustrates a side view of the rotating display 900 at time $t_2$. At time $t_2$, the display has rotated clockwise a portion of a revolution and the display boundary is moved to position 915*b*. Symbol 902*a* is partially rotated into view and a next symbol 914 is rendered in zone 908. Symbol 902*f* may no longer be in view and may be past a location 915 where symbols are no longer rendered. Thus, in one embodiment, as shown in FIG. 2C, symbol 902*f* may not be rendered.

In other embodiments, the symbols, such as 902*b*-902*f*, may be rendered such that they appear to rotate at a different rate than the rotation rate 913 of the reel. For example, a gaming machine may be configured to allow a position of the symbols to be rendered such that they appear to remain in a constant position relative on the viewing window 905 while the reel is rotating display 900 is still rotating at rotation rate 913. In general, the symbols may be rendered as a function of time such that they appear to rotate faster or slower than the rotation rate of rotating display 900. Also, the symbols may be rendered so that they appear to rotate in the same or different direction as the rotating display 900. Further, the symbols, such as 902*b*-902*f*, may be rendered to appear moving even when the display 900 has stopped moving.

In addition, between the boundaries of visibility, some symbols or information rendered on the rotatable display may appear to move at one rate while other symbols may be appear to move at another rate. For instance, paylines, such as 902*a*, 902*b* and 902*c*, may be rendered to appear to remain in a constant position as viewed through the viewing window 905. Simultaneously, symbols, such as 902*a-e*, may be rendered such that they appear to moving, such as moving at the same rate as the rotation rate 913 of the rotatable display 900.

Also, in FIG. 2D, symbols, 902*b*-902*f*, may be rendered such that they appear to remain in a fixed position between times $t_1$ and $t_2$. Thus, at one or more times between times, $t_1$ and $t_2$, the gaming machine, such as the game controller, may be configured to determine a range of pixels on one or more displays including portions that are visible through the viewing window 905, such as between 980 and 981. Then, determine a sequence of symbols to draw, such as 902*b*-902*f*. The pixel locations may be determined for each of the symbols, 902*a* through 902*f*, as a function of time such that the position of the symbols appears to remain constant or move with a rate and direction as viewed through the viewing window 905 as the reel display rotates between positions 915*a* and 915*b*. The direction and rotation rate at which the symbols appear to move may be different than the direction and rotation rate 913 of display 900.

Figure 2E:
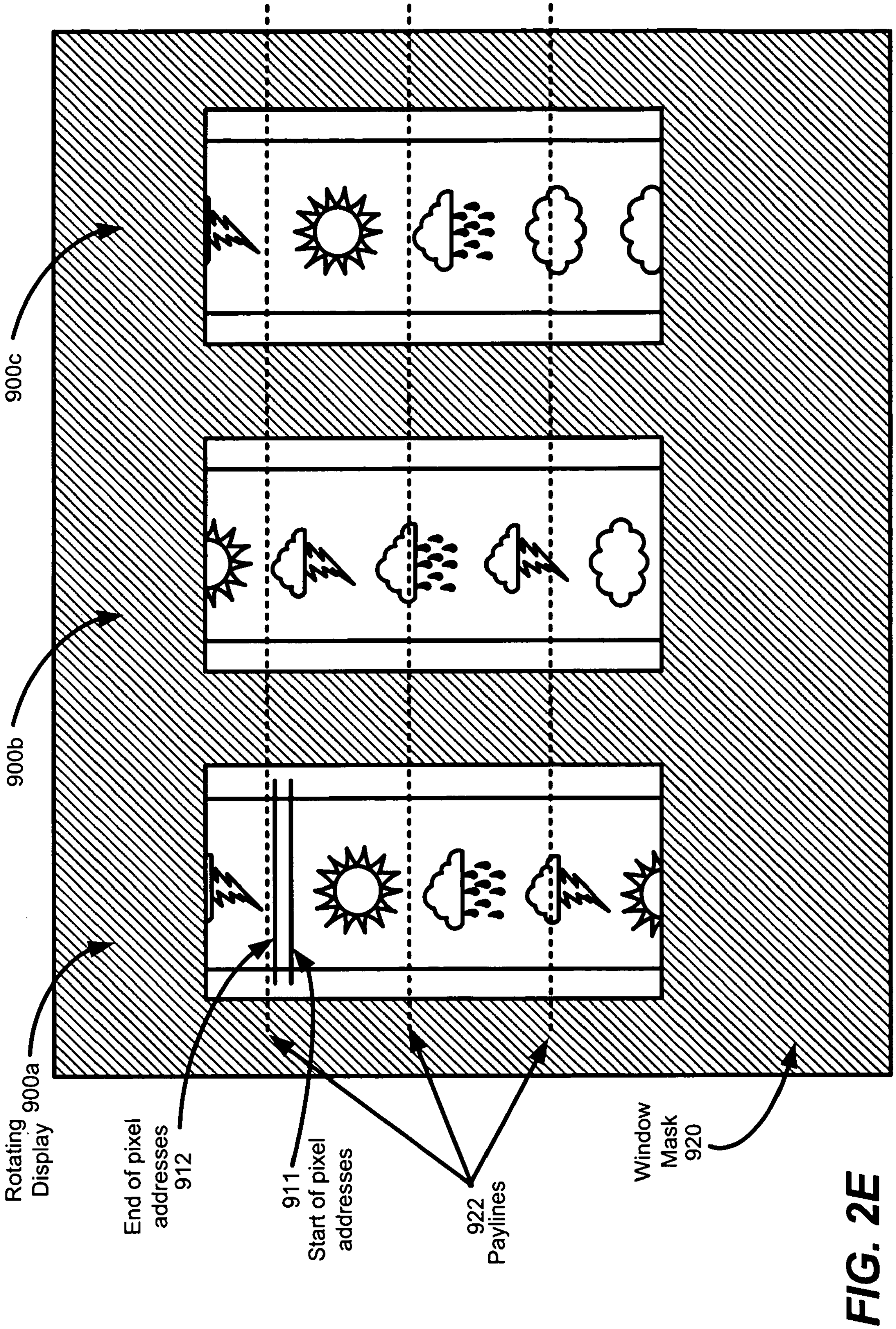
FIG. 2E is a front view of a 3 reels each with a rotatable display.

FIG. 2E is a front view of three rotating displays 900*a*, 900*b*, 900*c* as viewed through a window mask 920. Three paylines 922 are shown drawn on the window mask. The gaming machine may be configured to determine a location on the display (and associated pixel locations) where the paylines fall for each of the reel displays, 900*a*-900*c* and draw symbols on the reel displays such that when each reel display stop, the symbols are centered on each of the paylines.

In one embodiment, it may not be desirable to draw symbols across a display boundary. For example, the symbols drawn across display boundaries might appear to have slight imperfections if the displays are not exactly aligned. Thus, the gaming machine may be configured such that reel is not stopped in a position where a display boundary is close to one of the paylines, 922. For example, the reel may only be stopped, such that the display boundary, i.e., where end of pixels addresses and the start of the pixels addresses meet, is between paylines allowing for a whole symbol to be drawn on each payline without crossing over the boundary. In another embodiment, the displays 900*a*-900*c*, may be rotated such that when the rotating displays 900*a* are brought to a rest, a pixel boundary does not appear on the visible through the viewing window.

Figure 2G:
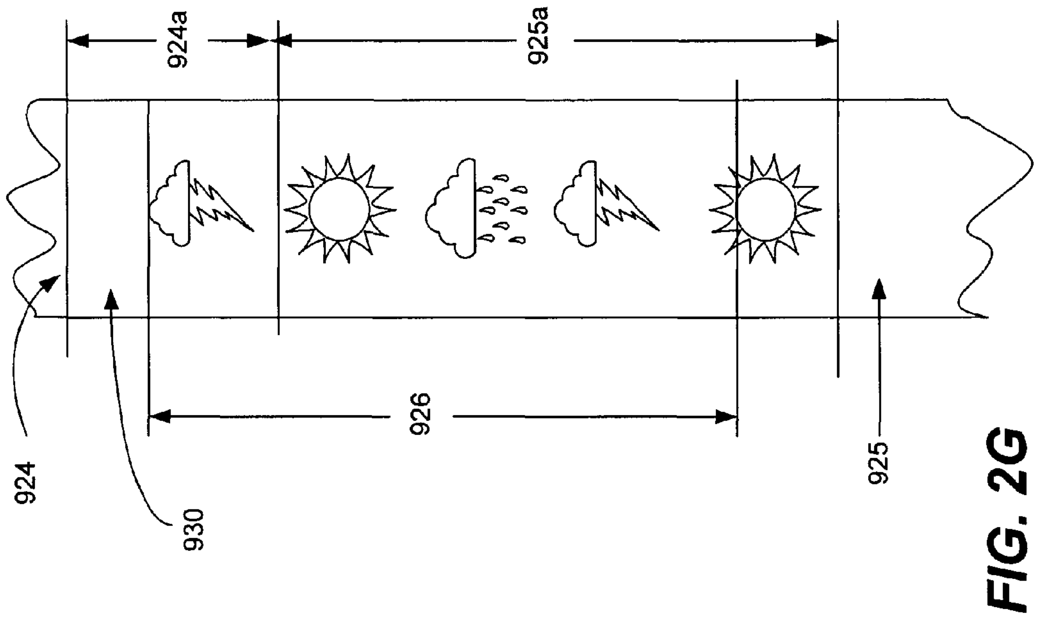
FIGS. 2F and 2G are planar views of a rotatable display with two display elements with different symbol distributions.
Figure 2F:
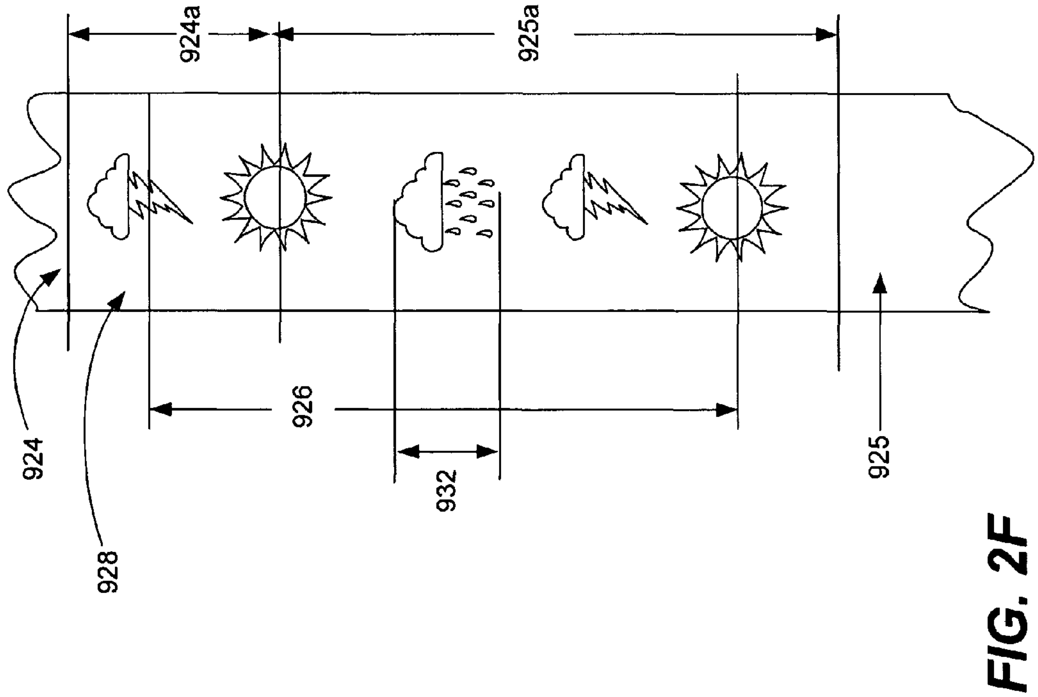

In FIG. 2F, a reel with two rotating display elements, 924 and 925, are shown. For instance, the first display 924 may be positioned around a first half of the circumference of a reel and display 925 may be positioned around a second half of the circumference of the reel. As previously described, a gaming machine component, such as the gaming machine controller and/or a reel controller, each alone or in combination, may be configured to determine a visibility range on the reel 926 relative to a viewing window. Then, a pixel range for which symbols are to drawn which includes the visibility range may be determined. In the figure, pixels from displays, 924 and 925, are visible. The pixels ranges for each display are denoted as pixel range 924*a* and 925*a*.

A symbol distribution may be determined that includes the symbols to draw across pixel ranges 924*a* and 925*a*. Each symbol may be drawn across a range of pixels, such as symbol range 932. The number of symbols that are visible at a particular time may be varied according to the size of the symbol and hence the range of pixels it utilizes when rendered. Within the pixel range other information besides symbols in various visual formats may be rendered at a particular time. Thus, the example of symbols is provided for illustrative purposes and is not meant to be limiting.

As described above, it may not be desirable to draw symbols across display boundaries, such as across pixel range 924*a* and 925*a*. In FIG. 2F, a symbol is shown drawn across the two displays according to symbol distribution 928. In FIG. 2G, in an alternate embodiment, it is determined that one of the symbols in symbol distribution 928 falls across a display boundary, such as in FIG. 2F. Then, a new distribution of symbols, 930, is determined. The new distribution of symbols 930 may be selected such that none of the symbols in the symbol distribution is drawn across a display boundary.

Figure 2H:
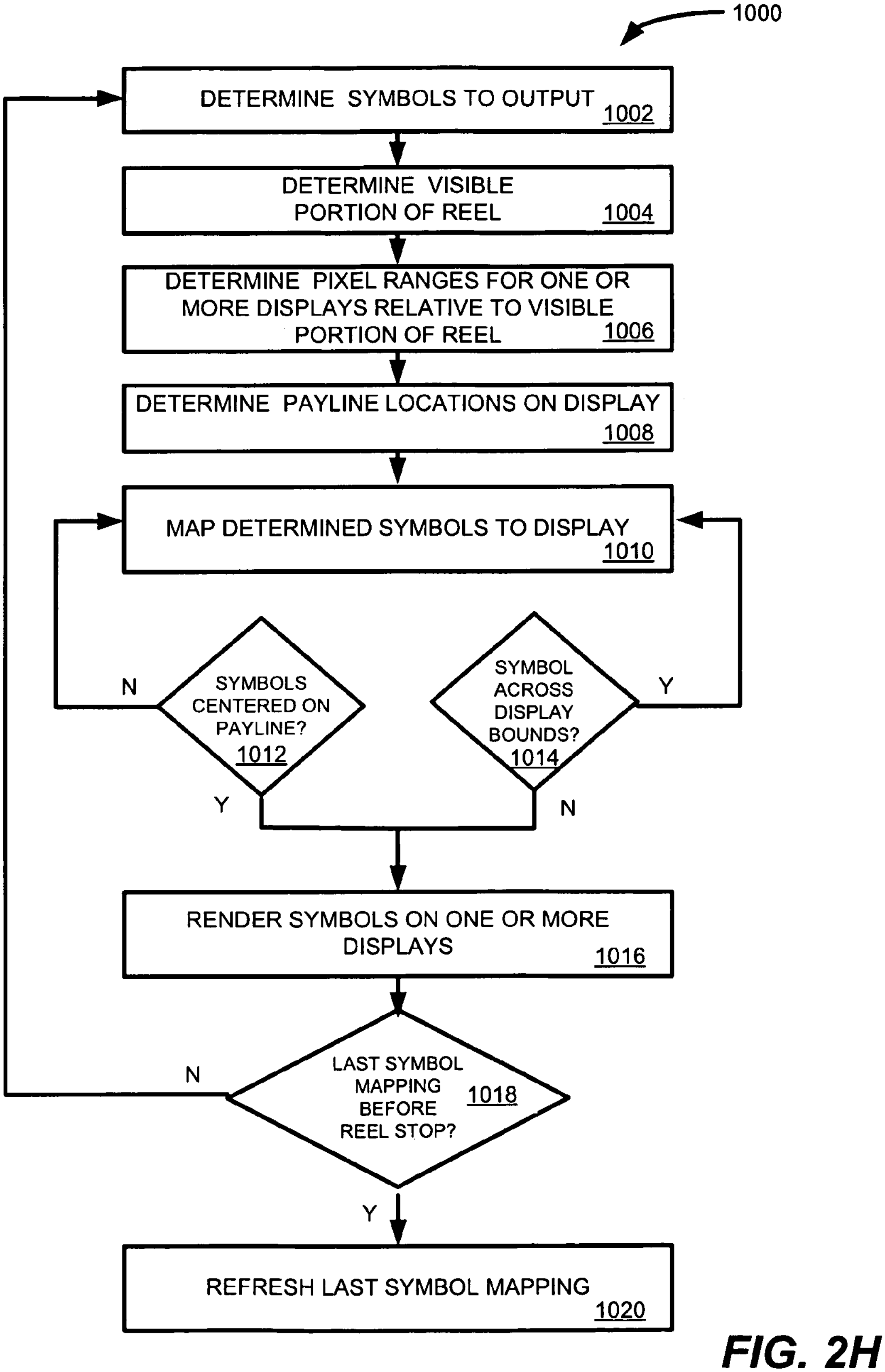
FIG. 2H is a flow chart of a method for rendering symbols on a rotatable display.

FIG. 2H is a flowchart of a method 1000 for generating output for a rotatable display. In 1002, symbols to output are determined. In one embodiment, the symbols may be associated with a reel strip that provides indicia for a wager-based game of chance played using the rotating display. The symbols for the reel strip and instructions for generating the symbols may be stored in a memory device on the gaming machine. In one embodiment, the symbols may be selected in an order defined by the reel strip, such that no symbols are skipped in the sequence and the symbols are selected starting from the beginning when an end of the sequence is reached. In other embodiments, the symbols may be selected such that some of the symbols may be skipped. The symbols may be selected so that they are displayed in a portion of the rotatable display that is visible on a gaming machine.

In 1004, portion of a reel including the rotatable display that is visible a particular time may be determined. The reel may be rotating. Thus, the portion of the reel that is visible may change over time. In 1006, a pixel ranges for one or more displays associate with a reel may be determined. The pixel ranges may include the portion of the reel that is visible at a particular time. In general, within a determined range of pixels, a distribution of visual content to display in the pixel ranges may be determined as a function of time where symbols are one example of visual content that may be displayed.

In 1008, paylines locations may be mapped to display locations including pixel locations for the portion of the display that is visible. In 1010, a number of symbols may be mapped to the reel including on or more display elements. In 1012, it may be optionally determined whether symbols are centered on paylines and in 1014, it may be optionally determined symbols are located across display bounds. In 1012 and 1014, if one or more symbols are not properly centered or if the symbols are distributed across a display boundary, then another may be generated in 1010. In 1012 and 1014, if the symbols are centered and are not located across a display boundary, then in 1016, the symbols may be rendered to the one or more displays 1016 including a portion of the rotatable display that is visible.

In 1018, it may be checked whether the reel is about to stop. When the reel is about to stop, the current symbol mapping may be allowed to rotate into a final resting position and in 1020 the current symbol mapping may be refreshed where the pixel locations for the symbol mapping may remain fixed. The current symbol mapping may also be stored to a non-volatile memory as part of a game history. The gaming machine may be operable to recall and display this information in the event of a dispute. In 1018, when the reel is still rotating, the process may return to 1002 and repeated.

Figure 3:
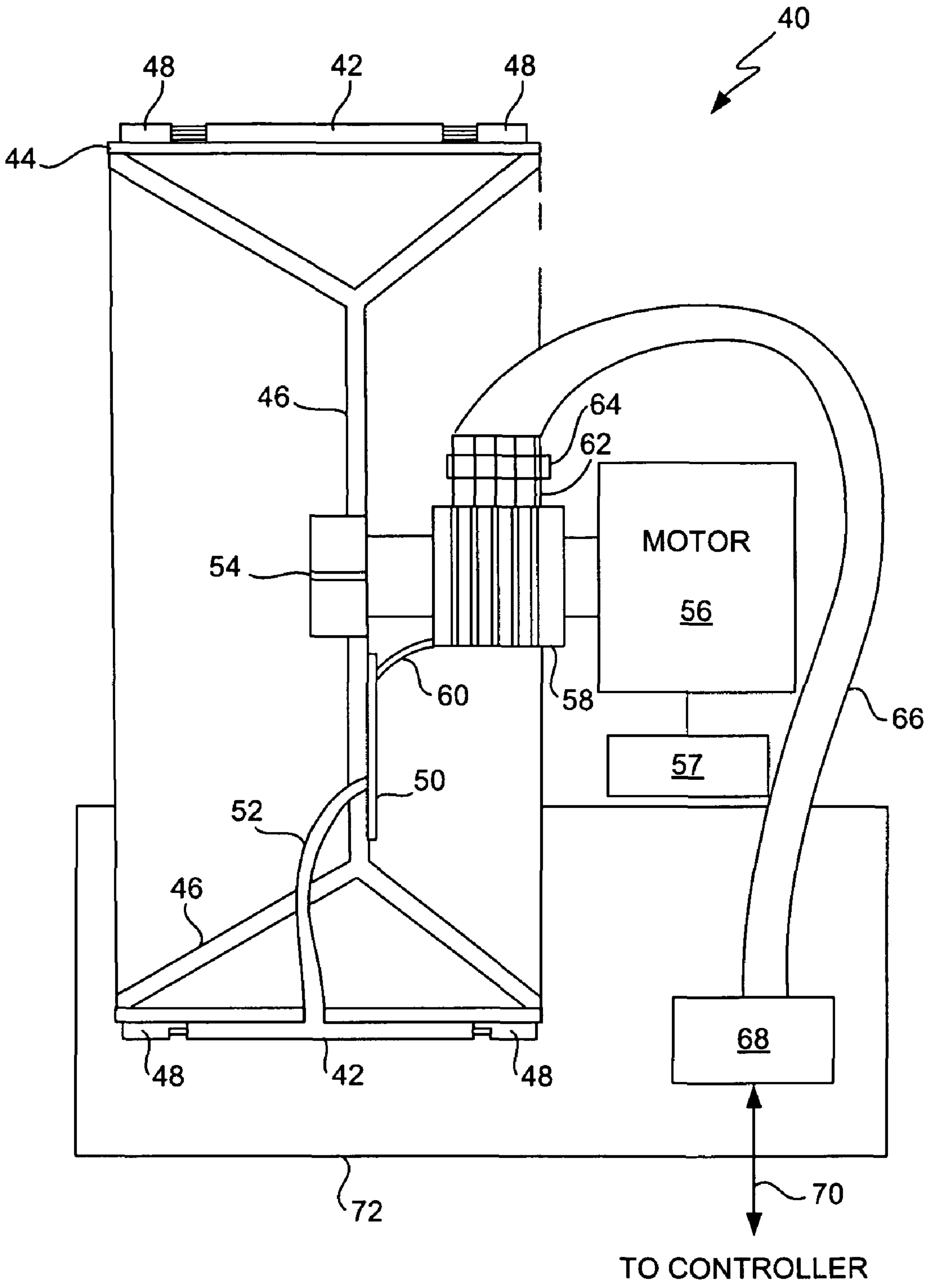
FIG. 3 is a front cross-sectional view of a display panel reel together with a drive motor and electrical connection to an external control circuit.

FIG. 3 presents a cross sectional view of the reel 40 in accordance with one embodiment. Specifically, FIG. 3 shows a cross section through the axis of rotation and perpendicular to the reel's radius. As shown in the cross section, the slot machine reel 40 may include the display panel 42 mounted to the outer circumference 44 of the internal or supporting portion 46 of the reel 10. A display driver 50 may be mounted to the interior of supporting portion 46 of the reel 40. The display driver 50 may control at least a portion of the displayed indicia in the flexible display panel 42. The display driver 50 and e display panel 42 may be electrically connected through one or more lines 52.

The supporting portion 46 of the reel 40 may rotate about an axis of rotation 54, the rotation being controlled by a drive motor 56. The drive motor 56 may be a stepper motor such as an ASTROSYN Miniangle Stepper type motor bearing model number 34PM-C007-14, which is available from Minebea Co. LTD. Alternatively, as will be appreciated by those having ordinary skill in the art, other types of motors may be used. Slip ring drum 58 may be attached to axis of rotation 54 and may further be electrically connected to the display driver 50 via electrical lines 60. During rotation of the reel by drive motor 56, slip ring drum 58, electrical lines 60, and display driver 50 may all rotate together about the axis of rotation 54.

The reel 40 may have voltage monitoring circuitry coupled to the motor 56 to detect power interruption. Further, in case of a power loss, the reels may utilize a battery backup 57 to continue to display the symbols on the reel 40 for at least the portion of the reel facing the player. Each reel 40 may use several power supply voltages to operate. If any of these voltages falls out of the tolerance limits of the circuitry they power, unpredictable operation of the reel may result. Out of tolerance voltages can cause software malfunction, creating a potential uncontrolled condition in the gaming computer. The voltage monitoring circuitry implemented may have two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer. However, the reel 40 may continue to function in case of a power interruption with a battery backup 57. In case of a power interruption, the reel 40 may continue to display the symbols on the reel 40 for at least the portion of the reel 40 facing the player.

An electrical control signal, which provides instructions to the display driver 50, may be provided from outside the rotating reel via brushes 62 mounted to brush block 64. The control signal to the brush block 64 may, in turn, be provided by a cable 66 which may mount to a connector 68. At least one line 70 from the connector 68 may be provided to a controller, described below, which controls the game's displayed indicia and the game outcome. The entire reel mechanism may be mounted on a stand 72.

Figure 4:
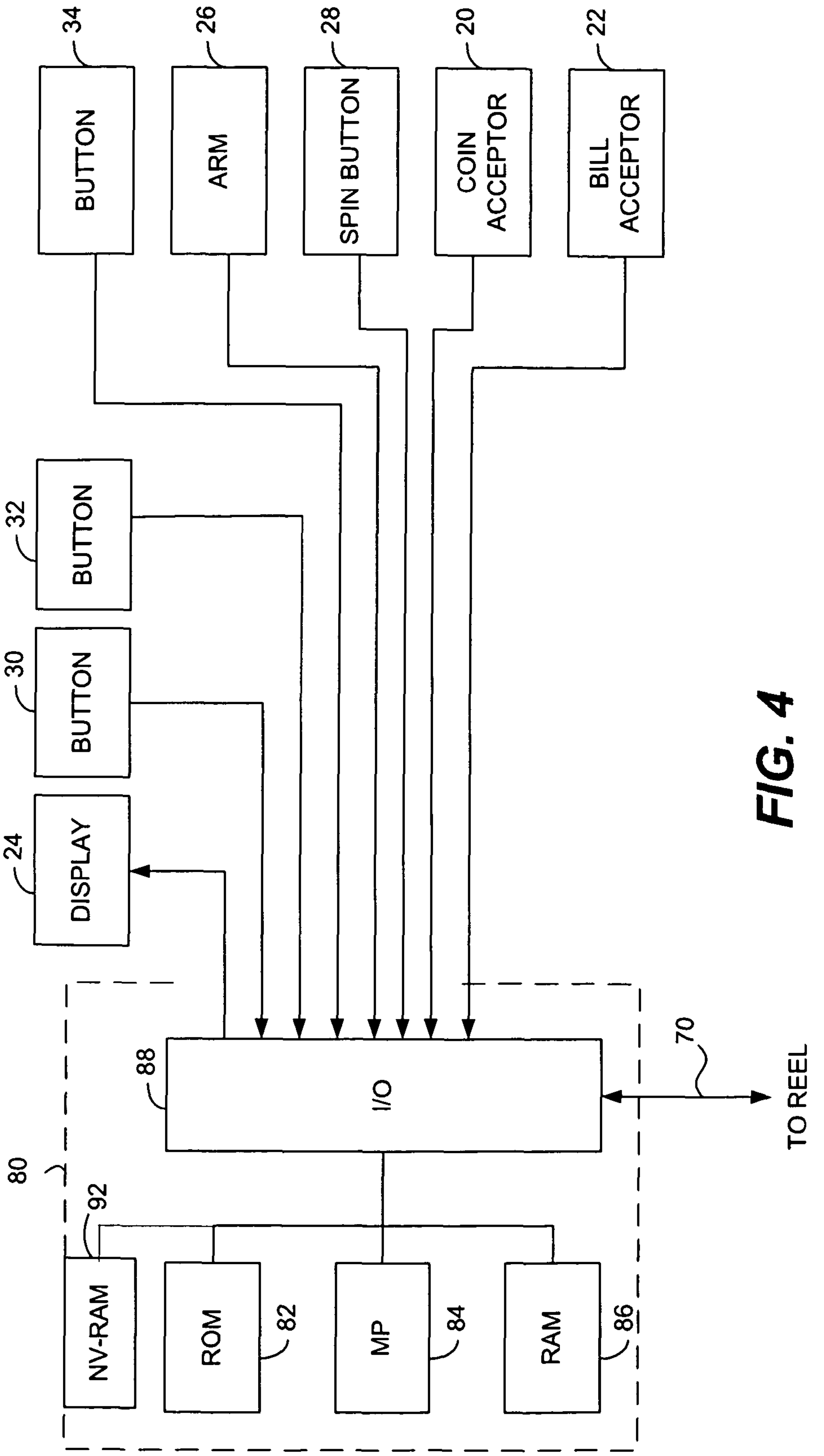
FIG. 4 is a block diagram of the electronic control circuit components associated with a gaming apparatus.

FIG. 4 is a block diagram of a number of components that may be incorporated into the present invention. Referring to FIG. 4, a controller 80 may comprise a read-only memory (ROM) 82, a microcontroller or microprocessor (MP) 84, a random-access memory (RAM) 86, a non-volatile random access memory (NV-RAM) 92, and an input/output circuit (I/O) 88 all of which may be interconnected connected via an address/data bus 90. The line 70 from the controller 80 may be provided to the connector 68. It should be appreciated that although only one microprocessor 84 is shown, the controller 80 could include multiple microprocessors 84. Similarly, the memory of the controller 80 could include multiple RAMs 86 and multiple ROMs 82. The RAM(s) 86 and ROM(s) 82 could be implemented as semiconductor memories, magnetically readable memories, and/or optically readable memories, for example. Furthermore, although the I/O circuit 88 is shown as a single block, it should be appreciated that the I/O circuit 88 could include a number of different types of I/O circuits, including an I/O circuit with the ability to receive local network, wide area network, Internet and/or Intranet addressable information. Moreover the I/O circuit 88 may be adapted to receive a number of signals which may allow a programmer to change the information stored within the RAM(s) 86 and/or ROM(s) 82 and therefore vary the game play described below.

FIG. 4 also illustrates that the components described above could be connected to the I/O circuit 88 via a respective direct line or conductor. Different connection schemes could be used. For example, one or more of the components shown in FIG. 4 could be connected to the I/O circuit 88 via a common bus or other data link that is shared by a number of components. Furthermore, some of the components could be directly connected to the microprocessor 84 without passing through the I/O circuit 88.

Gaming machines are designed to be state-based systems. Different functions of the game (bet, play, result, points in the graphical presentation, etc.) may be defined as a state. In a state-based system, the system stores and maintains its current state in a NV-RAM, such that, in the event of a power failure or other malfunction the gaming machine will return to its current state when the power is restored. This is critical to ensure the player's wager and credits are preserved and to minimize potential disputes in the event of a malfunction on the gaming machine. For instance, if a player was shown an award for a game of chance and, before the award could be provided to the player the power failed, the gaming machine, upon the restoration of power, would return to the state where the award is indicated. This requirement affects the software and hardware design on a gaming machine.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines typically have power supplies with tighter voltage margins than that required by the operating circuitry. In addition, the voltage monitoring circuitry implemented in IGT™ gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, a bonus game may be triggered during the play of a game of chance where a player is required to make a number of selections on a video display screen. When a malfunction has occurred after the player has made one or more selections, the gaming machine may be restored to a state that shows the graphical presentation just prior to the malfunction including an indication of selections that have already been made by the player. The graphical presentation that is restored may include content that is displayed on the rotatable displays prior to the malfunction. In general, the gaming machine may be restored to any state in a plurality of states that occur in the game of chance that occurs while the game of chance is played or to states that occur between the play of a game of chance. Thus, in case of a power interruption, the symbols displayed on the reel, for at least the portion of the reel facing the player, would continue to be displayed.

Game history information regarding previous games played such as an amount wagered, the outcome of the game and so forth may also be stored in the NV-RAM 92. The information stored in the non-volatile memory may be detailed enough to reconstruct a portion of the graphical presentation that was previously presented on the gaming machine and the state of the gaming machine (e.g., credits) at the time the game of chance was played, such as visual content including but not limited to game play indicia, that was output on rotatable displays described herein at a particular time. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Figure 5:
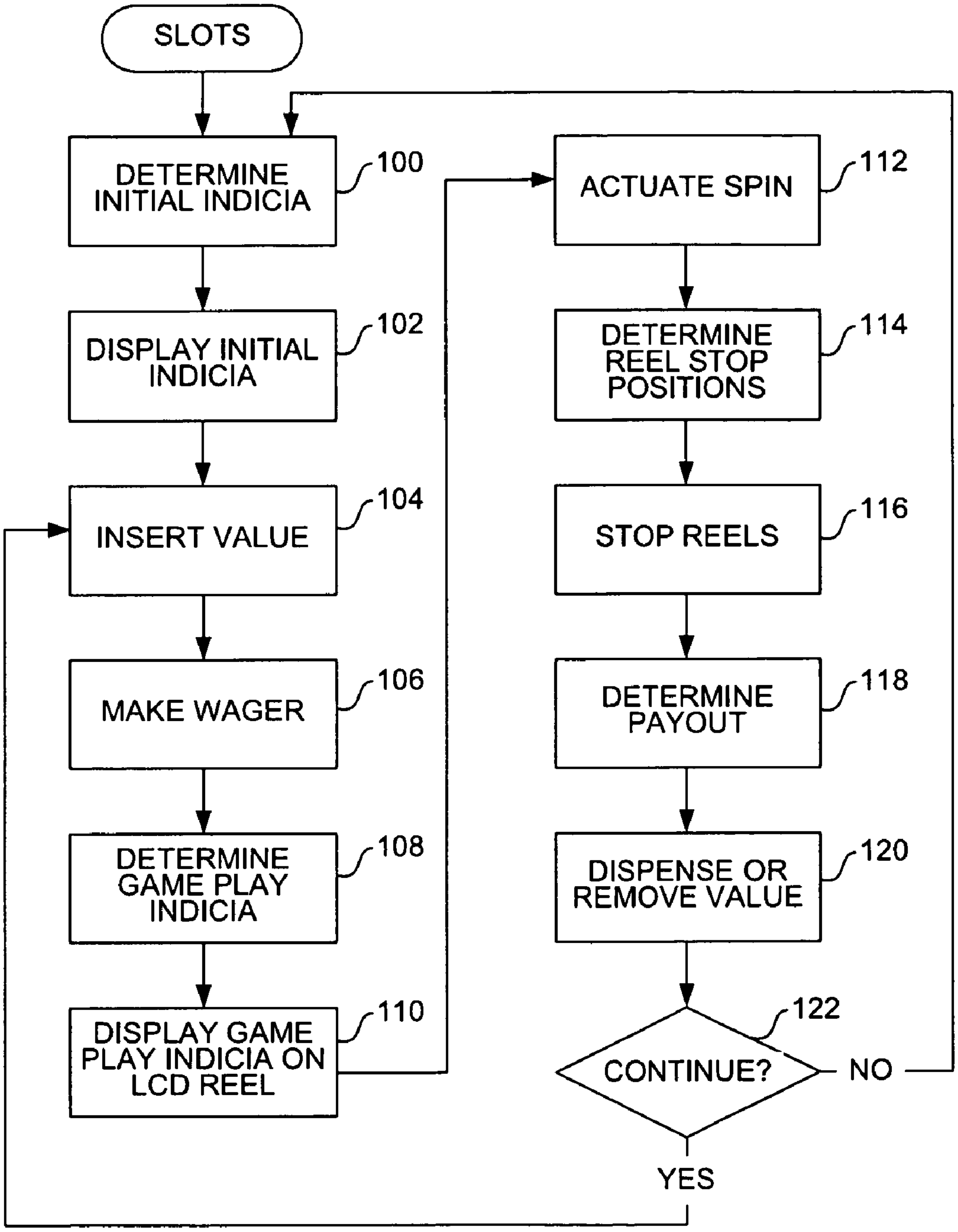
FIG. 5 is a flowchart of a gaming routine that may be performed by the electronic control circuit components of FIG. 4.

A typical use of the slot machine 10 containing the rotatable display panel 42 is set forth in the flow diagram illustrated in FIG. 5. Prior, to initiating game play, the controller 80 may initiate a calibration check to determine whether visual content is being output at its proper location at one or more reel positions, such as when the reel is at a first position determining that viewable symbols are properly centered along a payline. This calibration procedure may be performed utilizing one or more sensors coupled to the controller 80 and/or the reel 70.

After calibration, the controller 80 may determine the initial indicia to display on reels 14, 16, 18 at 100. For example, the controller 80 may be programmed to choose indicia designed to attract a player to the slot machine 10, such as gaming instructions, or simulations of game play. The controller 80 may instruct the display driver 50 to display the chosen indicia at 102. Once attracted to the slot machine 10, a user may begin game play by inserting into the slot machine 10 value that the user may bet at 104. For example, a user may deposit tokens or coins via the slot 20, may insert a monetary bill into the bill acceptor 22, or may insert an appropriate item into the player tracking slot 38. The following description refers to value being inserted into and dispensed from the slot machine 10. As used herein the term "value" is intended to encompass conventional tokens, coin or bill currency, debit card, smartcard or any other suitable objects that may be representative of some monetary value. Furthermore, as used herein the term value may include cards having value associated therewith (e.g., printed cards, smart cards or the like).

In one embodiment, still images or video may be streamed to one or more of the rotating displays, such as reels 14, 16 and 18. The still images may be used to support player tracking features available on the gaming machine. In one embodiment, at one or more times, visual content may be provided to a rotating display based upon commands, instructions or data provided by a remote server. For example, the remote server may request that a particular flash application to be loaded and output on one of the rotating displays. The flash application may provide advertising features or third-party offers. As another example, a third-party may provide a symbol as an advertising feature that substitutes for one or more game symbols or a player may provide a symbol. Advertising or other visual content may be provided by one or more servers, i.e., a first server, such as a player tracking server, may provide first content and a second server, associated with a third party different from the casino, may provide second content.

Details of providing such content are described in co-pending U.S. application Ser. No. 11/595,774, filed Nov. 10, 2006 and titled, "Method and Apparatus for Integrating Remotely-Hosted and Locally Rendered Content on a Gaming Device," and co-pending U.S. application Ser. No. 12/209,608, filed Sep. 12, 2008 and titled, "Gaming Machine with Externally Controlled Content Display," each of which is incorporated by reference in their entirety and for all purposes.

Once the controller 80 recognizes that the user has deposited value, the user may make a wager using the buttons 30, 32, 34 at 106. By using the buttons 30, 32, 34 the user may wager various units of value on the outcome of the game. The controller 80 may then determine the game play indicia for each reel 14, 16, 18 at 108. It will be recognized by those skilled in the art that the controller 80 may be programmed to determine an infinite variety of game play indicia and furthermore, the criteria for determining the indicia may be based upon any criteria. For example, game play indicia may be themed to a particular casino, gaming machine, gaming area, and/or game show, and the indicia may be further chosen based upon the amount of value inserted by the user. Furthermore, the controller 80 may be programmed to dynamically change the chosen indicia before, during or after game play to offer the user a unique game play experience. This change may be initiated in response to player input, in response to a command initiated from a remote device in communication with the controller, in response to an event detected by the controller 80 or combinations thereof. Once the game play indicia is determined, at 110, the controller 80 may instruct the display driver 50 to display the game play indicia on the rotatable display panel 42 associated with each of the reels 14, 16, 18. The user may then begin a game play, at 112, either by pulling the arm 26 or by depressing the spin button 28, either of which causes the slot machine 10 to spin the reels 14, 16, 18 for a period of time.

The controller 80 may determine the outcome of the game and determine the reel stop positions at 114. The controller 80 may then stop the reels 14, 16, 18 from spinning according to the determined outcome of the game at 116. As the reels 14, 16, 18 are stopped, indicia representative of the game outcome may be displayed to the user on the rotatable display panels 42 of each of the associated reels 14, 16, 18. The controller 80 may examine the indicia displayed to the user and determines the payout afforded the user based upon gaming instructions stored within the controller 80 at 118. For example, the gaming machine may be programmed to pay a scheduled amount if three sevens are displayed to the user.

At 120, the slot machine 10 may either dispense or remove value based upon the analysis at 118. For example, a "winning" combination of indicia pays out by dispensing value to the user, while a "losing" combination removes the value wagered by the user. The concept of dispensing value may include dropping tokens into the payout tray 36, accumulating value for the user within the slot machine 10, printing a ticket, crediting an account, transferring credits to a card or any other suitable technique of distributing value to a user. Regardless of the outcome, at 122, the user is presented with the option of continuing game play, in which case the process returns to the block 104, or ending game play, in which case the game play returns to the block 100 to attract another player.

Exemplary System Architecture

Figure 6:
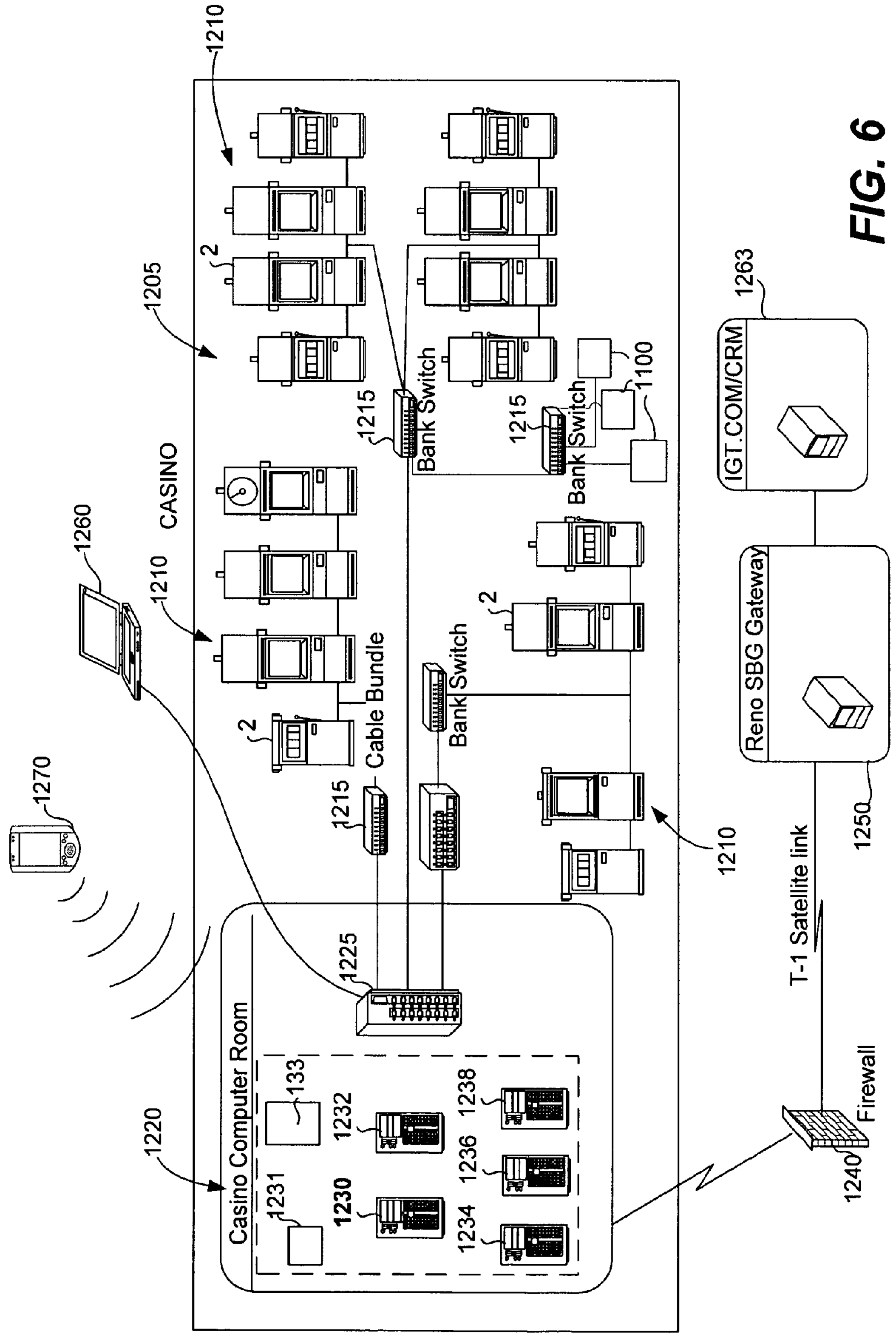
FIG. 6 is a block diagram of an embodiment of a network topology.

One example of a network topology for implementing some aspects of the present invention is shown in FIG. 6. Those of skill in the art will realize that this exemplary architecture and the related functionality are merely examples and that the present invention encompasses many other such embodiments and methods. Here, for example, a single gaming establishment 605 is illustrated, which is a casino in this example. However, it should be understood that some implementations may involve multiple gaming establishments.

Gaming establishment 605 includes 16 gaming machines 2, each of which is part of a bank 610 of gaming machines 2. In this example, gaming establishment 605 also includes a bank of networked gaming tables 1100. It will be appreciated that many gaming establishments include hundreds or even thousands of gaming machines 2 and/or gaming tables 1100, not all of which are included in a bank. However, any number of gaming machines, gaming tables, etc. may be used.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 625, which combines switching and routing functionality in this example) and/or the inclusion of other network devices not shown in FIG. 6. For example, some implementations of the invention include one or more middleware servers disposed between gaming machines 2 and server 630. Such middleware servers can provide various useful functions, including but not limited to the filtering and/or aggregation of data received from bank switches 615, from individual gaming machines and from other player terminals. Some implementations of the invention include load balancing methods and devices for managing network traffic.

Each bank 610 has a corresponding bank switch 615, which may be a conventional bank switch. Each bank switch is connected to server-based gaming ("SBG") server 630 via main network device 625, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security. Details of some of these protocols may be obtained from the Gaming Standards Association (GSA), Fremont, Calif.

SBG server 630, License Manager 631, Arbiter 733, servers 632, 634, 636 and 638, and main network device 625 are disposed within computer room 620 of gaming establishment 605. In practice, more or fewer servers may be used. Some of these servers may be configured to perform tasks relating to player tracking, bonusing/progressives, etc. Some servers may be configured to perform tasks specific to the present invention. License Manager 631 may also be implemented, at least in part, via a server or a similar device. Some exemplary operations of License Manager 631 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 630 can also be configured to implement, at least in part, various aspects of the present invention. For example, new games of chance, symbols to play the games of chance, and instructions to display the symbols on the reels may be downloaded from the SBG server 630 to gaming machines 2. Some preferred embodiments of SBG server 630 and the other servers shown in FIG. 6 include (or are at least in communication with) clustered CPUs, redundant storage devices, including backup storage devices, switches, etc.

Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 631, servers 632, 634, 636 and 638, and main network device 625) are mounted in a single rack with SBG server 630. Accordingly, many or all such devices will sometimes be referenced in the aggregate as an "SBG server." However, in alternative implementations, one or more of these devices is in communication with SBG server 630 and/or other devices of the network but located elsewhere. For example, some of the devices could be mounted in separate racks within computer room 620 or located elsewhere on the network. For example, it can be advantageous to store large volumes of data elsewhere via a storage area network ("SAN"). In some embodiments, these components are SBG server 630 preferably has an uninterruptible power supply ("UPS"). The UPS may be, for example, a rack-mounted UPS module.

Computer room 620 may include one or more operator consoles or other host devices that are configured for communication with SBG server 630. Such host devices may be provided with software, hardware and/or firmware for implementing various aspects of the invention; many of these aspects involve controlling SBG server 630. However, such host devices need not be located within computer room 620. Wired host device 660 (which is a laptop computer in this example) and wireless host device (which is a PDA in this example) may be located elsewhere in gaming establishment 605 or at a remote location.

Arbiter 733 may be implemented, for example, via software that is running on a server or another networked device. Arbiter 733 serves as an intermediary between different devices on the network. Some implementations of Arbiter 733 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 733 is a repository for the configuration information required for communication between devices on the gaming network (and, in some implementations, devices outside the gaming network). Although Arbiter 733 can be implemented in various ways, one exemplary implementation is discussed in the following paragraphs.

Figure 7:
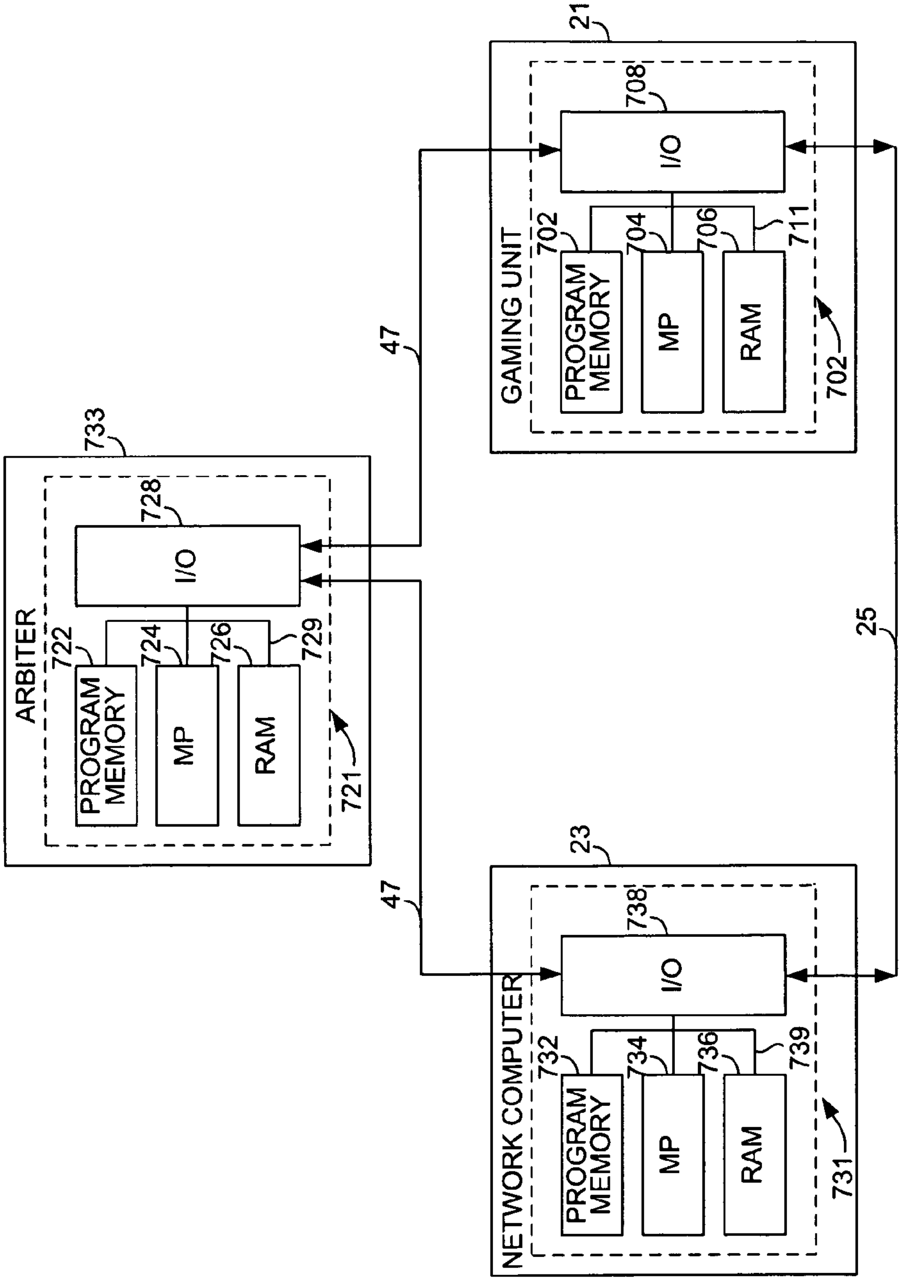
FIG. 7 is a block diagram of an embodiment of a communication topology.

FIG. 7 is a block diagram of a simplified communication topology between a gaming unit 21, the network computer 23 and the Arbiter 733. Although only one gaming unit 21, one network computer 23 and one Arbiter 733 are shown in FIG. 7, it should be understood that the following examples may be applicable to different types of network gaming devices within the gaming network beyond the gaming unit 21 and the network computer 23, and may include different numbers of network computers, gaming security arbiters and gaming units. For example, a single Arbiter 733 may be used for secure communications among a plurality of network computers 23 and tens, hundreds or thousands of gaming units 21. Likewise, multiple gaming security arbiters may be utilized for improved performance and other scalability factors.

Referring to FIG. 7, the Arbiter 733 may include an arbiter controller 721 that may comprise a program memory 722, a microcontroller or microprocessor (MP) 724, a random-access memory (RAM) 726 and an input/output (I/O) circuit 728, all of which may be interconnected via an address/data bus 729. The network computer 23 may also include a controller 731 that may comprise a program memory 732, a microcontroller or microprocessor (MP) 734, a random-access memory (RAM) 736 and an input/output (I/O) circuit 738, all of which may be interconnected via an address/data bus 739. It should be appreciated that although the Arbiter 733 and the network computer 23 are each shown with only one microprocessor 724, 734, the controllers 721, 731 may each include multiple microprocessors 724, 734. Similarly, the memory of the controllers 721, 731 may include multiple RAMs 726, 736 and multiple program memories 722, 732. Although the I/O circuits 728, 738 are each shown as a single block, it should be appreciated that the I/O circuits 728, 738 may include a number of different types of I/O circuits. The RAMs 724, 734 and program memories 722, 732 may be implemented as semiconductor memories, magnetically readable memories, and/or optically readable memories, for example.

Although the program memories 722, 732 are shown in FIG. 7 as read-only memories (ROM) 722, 732, the program memories of the controllers 721, 731 may be a read/write or alterable memory, such as a hard disk. In the event a hard disk is used as a program memory, the address/data buses 729, 739 shown schematically in FIG. 7 may each comprise multiple address/data buses, which may be of different types, and there may be an I/O circuit disposed between the address/data buses.

As shown in FIG. 7, the gaming unit 21 may be operatively coupled to the network computer 23 via the data link 25. The gaming unit 21 may also be operatively coupled to the Arbiter 733 via the data link 47, and the network computer 23 may likewise be operatively coupled to the Arbiter 733 via the data link 47. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, the Arbiter 733 may verify the authenticity of each network gaming device. The Arbiter 733 may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The Arbiter 733 may provide encryption keys (session keys) for the communication session to the client via the secure communication channel. Either the host and/or the session key may be provided in response to the request, or may have been previously provided. The client may contact the host to initiate the communication session. The host may then contact the Arbiter 733 to determine the authenticity of the client. The Arbiter 733 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 733 may contact the host regarding the request and provide corresponding session keys to both the client and the host. The Arbiter 733 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs or even cellular telephones. Referring once again to FIG. 6, one or more network devices in gaming establishment 1205 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 1205 and the outside world should only be made with trusted devices via a secure link, e.g., via a virtual private network ("VPN") tunnel. For example, the illustrated connection between SBG 1230, gateway 1250 and central system 1263 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 1263 (in this example, IGT.com) to obtain the account information such as the customer's current and prior account status.

Moreover, such a secure connection may be used by the central system 1263 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 1263 may notify a local SBG server regarding new products and/or product updates. For example, central system 1263 may notify a local SBG server regarding updates of new gaming software, gaming software updates, peripheral updates, the status of current gaming software licenses, etc. In some implementations of the invention, central system 1263 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 1263 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 1263 and the gaming establishments.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A gaming machine, comprising:

a cabinet;

a plurality of reels mounted within the cabinet, each reel comprising a physical reel structure rotatable about an axis and having an outer perimeter region;

a motor capable of rotating said physical reel structure;

at least one display mounted on the outer perimeter region configured to rotate with the physical reel structure, said display comprising an array of addressable pixels and a display driver configured to allow each of the addressable pixels in the array to be activated; a reel mask mounted to the outside of said cabinet including one or more viewing windows wherein a portion of each of the plurality of reels is visible through said one or more viewing window;

a memory device configured to store 1) a sequence of a game play indicia and 2) data and/or instructions for generating images for each indicium in the sequence of the game play indicia; and a gaming controller, communicatively coupled to the plurality of reels and the memory device, designed or configured to a) receive a wager on an outcome of the wager-based game of chance; b) determining an outcome to the wager-based game wherein the outcome is indicated by a combination of indicium selected from the sequence of game play indicia; c) instruct each of the plurality of reels to start rotating; d) while each of the plurality of reels is rotating, determine a first portion of each of the plurality of reels that is visible at a first time; determine a plurality of pixel addresses on the at least one display associated with the first portion of each of the plurality of reels; for each of the plurality of reels, select a sub-set of game play indicia from the sequence; for each of the plurality of reels, render images of the selected sub-set of game play indicia to the plurality of pixel addresses; e) while each of the plurality of reels is rotating, repeat step d one or more times; and e) at least when each of the plurality of reels are at rest, render images of the combination of indicium selected from the sequence of game play indicia that indicate the outcome to wager-based game.

2. The gaming machine of claim 1, each reel further comprising a voltage monitor configured to detect a power interrupt to the reel.

3. The gaming machine of claim 1, each reel further comprising a battery backup coupled to the at least one display wherein after a power interrupt is detected to the reel, the battery backup is for enabling one or more indicium rendered on the at least one display prior to the power interrupt to persist on the display.

4. The gaming machine of claim 1, wherein an outer perimeter of the outer perimeter region of the reel structure is circular.

5. The gaming machine of claim 1, wherein for at least a first reel, the gaming controller is further designed or configured to repeat step d over time such that the rendered images of the selected sub-set of game play indicia appear to rotate at a rate that is independent of a rotation rate of the first reel.

6. The gaming machine of claim 1, wherein for at least a first reel, the gaming controller is further designed or configured to repeat step d over time such that the rendered images of the selected sub-set of game play indicia appear to rotate at a rate greater than a rotation rate of the first reel.

7. The gaming machine of claim 1, wherein for at least a first reel, the gaming controller is further designed or configured to repeat step d over time such that the rendered images of the selected sub-set of game play indicia appear to rotate at a rate less than a rotation rate of the first reel.

8. The gaming machine of claim 1, wherein for at least a first reel, the gaming controller is further designed or configured to repeat step d over time such that one or more indicium appear to remain stationary while the first reel is rotating.

9. The gaming machine of claim 1, wherein for at least a first reel, the gaming controller is further designed or configured to repeat steps d-g step d over time such a first indicium appears to rotate at a first rate while a second indicium appears to rotate at a second rate.

10. The gaming machine of claim 1, wherein each reel further comprises a lighting source mounted to the reel structure to illuminate the at least one display wherein the at least one display comprises a top side facing the one or more viewing windows and the lighting source is orientated to illuminate at least a bottom side opposite of the top side of said at least one display.

11. The gaming machine of claim 10, wherein the lighting source comprises one or more LED elements.

12. The gaming machine of claim 1, wherein the at least one display comprises one or more lighting emitting elements.

13. The gaming machine of claim 12, wherein the at least one display comprises an OLED or a PLED display.

14. The gaming machine of claim 1, wherein the gaming controller is further designed or configured to download the sequence of game play indicia from a remote device.

15. The gaming machine of claim 1, wherein during the play of a single game of the wager-based game of chance on at least a first reel and while the first is rotating, the gaming controller is further designed or configured to 1) render a first image associated with a first indicium at a first location on the outer perimeter region of the first reel at first time, said first image visible through the one or more viewing window and 2) render a second image associated with a second indicium at a second time at the first location on the outer perimeter region of the first reel, said second image visible through the one or more viewing windows.

16. The gaming machine of claim 1, wherein the memory device further comprises at least two sequences of game play indicia where a number of indicium in the first sequence is different than a number of indicium in the second sequence.

17. The gaming machine of claim 16, wherein the gaming controller is further designed or configured to use either the first sequence or the second sequence to generate the outcome for the wager-based game of chance.

18. The gaming machine of claim 1, wherein the memory device further comprises a first data and/or first instructions for generating a first set of images for each indicium in the sequence of the game play indicia and a second data and/or second instructions for generating a second set of images for each indicium in the sequence of game play indicia.

19. The gaming machine of claim 18, wherein the gaming controller is further designed or configured to use either the first set of images or the second set of images to indicate the outcome to the wager-based game of chance.

* * * * *

UNITED STATES PATENT AND TRADEMARK OFFICE
CERTIFICATE OF CORRECTION

PATENT NO. : 8,342,938 B2
APPLICATION NO. : 12/247844
DATED : January 1, 2013
INVENTOR(S) : Craig A. Paulsen et al.

It is certified that error appears in the above-identified patent and that said Letters Patent is hereby corrected as shown below:

IN THE CLAIMS

In Claim 1, Column 27, Line 44, replace “the” with --an--.
In Claim 1, Column 27, Line 47, replace “window” with --windows--.
In Claim 1, Column 27, Line 54, replace “of the” with --to a--.
In Claim 1, Column 27, Line 55, replace “an” with --the--.
In Claim 1, Column 27, Line 57, replace “indicium” with --indicia--.
In Claim 1, Column 27, Line 58, between “of” and “game” insert --the--.
In Claim 1, Column 27, Line 65, after “sequence;” insert --and--.
In Claim 1, Column 28, Line 2, replace “e)” with --f)--.
In Claim 1, Column 28, Line 4, replace “indicium” with --indicia--.
In Claim 1, Column 28, Line 5, between “of” and “game” insert --the--.
In Claim 1, Column 28, Line 6, between “to” and “wager” insert --the--.
In Claim 3, Column 28, Line 13, replace “indicium” with --indicia--.
In Claim 3, Column 28, Line 15, between “the” and “display” insert --at least one--.
In Claim 8, Column 28, Line 36, replace “indicium” with --indicia--.
In Claim 9, Column 28, Line 40, delete “steps d-g”.
In Claim 12, Column 28, Line 53, replace “lighting” with --light--.
In Claim 14, Column 28, Line 59, between “of” and “game” insert --the--.
In Claim 15, Column 28, Line 60, delete the second instance of “the”.
In Claim 15, Column 28, Line 62, between “first” and “is” insert --reel--.
In Claim 15, Column 28, Line 65, between “at” and “first” insert --the--.
In Claim 15, Column 28, Line 66, replace “window” with --windows--.
In Claim 16, Column 29, Lines 6 and 7, replace “indicium” with --indicia--.
In Claim 17, Column 29, Line 11, replace “for the” with --to the--.
In Claim 18, Column 20, Line 7, between “of” and “game” insert --the--.

Signed and Sealed this
Thirtieth Day of July, 2013

Teresa Stanek Rea
*Acting Director of the United States Patent and Trademark Office*